US008874601B2

(12) United States Patent
Hermanns et al.

(10) Patent No.: US 8,874,601 B2
(45) Date of Patent: Oct. 28, 2014

(54) SADL QUERY VIEW—A MODEL-DRIVEN APPROACH TO SPEED-UP READ-ONLY USE CASES

(75) Inventors: Marcel Hermanns, Heidelberg (DE); Jens Weiler, Weingarten (DE); Michael Brombach, Leimen (DE); Monika Kaiser, Bad Schoenborn (DE); Jan Teichmann, Neustadt/Weinstrasse (DE); Thomas Gauweiler, Speyer (DE); Daniel Hutzel, Karlsruhe (DE)

(73) Assignee: SAP AG, Walldorf (DE)

( * ) Notice: Subject to any disclaimer, the term of this patent is extended or adjusted under 35 U.S.C. 154(b) by 465 days.

(21) Appl. No.: 12/972,157

(22) Filed: Dec. 17, 2010

(65) Prior Publication Data

US 2012/0158797 A1 Jun. 21, 2012

(51) Int. Cl.
*G06F 17/30* (2006.01)

(52) U.S. Cl.
CPC .... *G06F 17/30389* (2013.01); *G06F 17/30421* (2013.01)
USPC .......................................... 707/763; 707/810

(58) Field of Classification Search
CPC ................................................ G06F 17/30421
USPC ................................................ 707/810, 763
See application file for complete search history.

(56) References Cited

U.S. PATENT DOCUMENTS

| | | | | |
|---|---|---|---|---|
| 5,182,806 | A | 1/1993 | McKeeman et al. | |
| 5,287,490 | A | 2/1994 | Sites | |
| 5,987,247 | A | 11/1999 | Lau | |
| 6,102,969 | A | 8/2000 | Christianson et al. | |
| 6,609,123 | B1 * | 8/2003 | Cazemier et al. | 707/999.004 |
| 6,687,734 | B1 | 2/2004 | Sellink et al. | |
| 6,732,109 | B2 * | 5/2004 | Lindberg et al. | 707/797 |
| 7,117,488 | B1 | 10/2006 | Franz et al. | |
| 7,219,339 | B1 | 5/2007 | Goyal et al. | |
| 7,290,252 | B2 | 10/2007 | Diedrich et al. | |
| 7,389,498 | B2 | 6/2008 | Meijer et al. | |
| 7,426,721 | B1 | 9/2008 | Saulpaugh et al. | |
| 8,087,009 | B1 | 12/2011 | Cornish | |
| 8,122,044 | B2 * | 2/2012 | Yeh et al. | 707/760 |
| 8,136,102 | B2 | 3/2012 | Papakipos et al. | |

(Continued)

OTHER PUBLICATIONS

Atul Adya et al., "Anatomy of the ADO.NET Entity Framework", ACM SIGMOD '07, Jun. 12-14, 2007, pp. 877-888.*

(Continued)

*Primary Examiner* — Rehana Perveen
*Assistant Examiner* — Scott A Waldron
(74) *Attorney, Agent, or Firm* — Fountainhead Law Group PC

(57) ABSTRACT

Embodiments of the invention relate to computing, and in particular, to a systems and methods for a querying a database. Certain embodiments implement a model-driven database query ("the SADL query") facilitating a design-time tool that allows a developer to create the query based upon existing Business Objects (BOs) and their associations. This SADL query leverages mapping between business-layer entities and database-layer entities, such mapping being derived from association metadata already extant in the business model used to create the Business Objects. In certain embodiments, query views may be based upon associations present within the business layer, rather than upon database-level entities (such as joins or restriction rules) that are typically relied upon in conventional query creation. Embodiments of the present invention may thus align query creation more closely with the structure of the business layer, and may also render query design agnostic relative to the identity of the underlying database.

15 Claims, 23 Drawing Sheets

(56) References Cited

U.S. PATENT DOCUMENTS

| | | | | |
|---|---|---|---|---|
| 8,150,862 | B2 | 4/2012 | Bhattacharya et al. | |
| 8,387,030 | B2 | 2/2013 | Brunswig et al. | |
| 2004/0230559 | A1 * | 11/2004 | Newman et al. | 707/1 |
| 2005/0027674 | A1 * | 2/2005 | Potter et al. | 707/1 |
| 2005/0120051 | A1 * | 6/2005 | Danner et al. | 707/104.1 |
| 2007/0226196 | A1 * | 9/2007 | Adya et al. | 707/3 |
| 2007/0226203 | A1 * | 9/2007 | Adya et al. | 707/4 |
| 2007/0239769 | A1 * | 10/2007 | Fazal et al. | 707/102 |
| 2008/0016516 | A1 * | 1/2008 | Brunswig et al. | 719/315 |
| 2008/0147421 | A1 * | 6/2008 | Buchmann et al. | 705/1 |
| 2009/0177625 | A1 | 7/2009 | Saxena et al. | |
| 2010/0070945 | A1 | 3/2010 | Tattrie et al. | |
| 2010/0082646 | A1 * | 4/2010 | Meek et al. | 707/752 |
| 2011/0161942 | A1 | 6/2011 | Brunswig et al. | |
| 2013/0326464 | A1 | 12/2013 | Hermanns et al. | |

OTHER PUBLICATIONS

Panos Vassiliadis et al., "ARKTOS: Towards the Modeling, Design, Control and Execution of ETL Processes", 2001, Elsevier Science Ltd, Information Systems 26, pp. 537-561.*

"Business Logic," Wikipedia over the Internet Archive, Feb. 8, 2009, pp. 1-3, retrieved from Internet: URL: http://web.archive.org/web/20090208001205/http://en.wikipedia.org/wiki/Business_logic.

Extended European Search Report (from a corresponding foreign application), EP 11004678.6, mailed Oct. 11, 2011.

Wolfgang Hoschek; "The Web Service Discovery Architecture"; Proceedings of the IEEE/ACM Supercomputing Conference, Baltimore, MD; 2002; 15 pages.

Georg Grossman, et al.; "A Conceptual Modeling Approach for Web Service Composition Supporting Service Re-Configuration"; Proceedings of the 7th Asia-Pacific Conference on Conceptual Modeling, Brisbane, Australia; 2010, pp. 43-52; 10 pages.

Mathias Rohl, et al.; "Composing Simulation Models Using Interface Definitions Based on Web Service Descriptions"; Proceedings of the 2007 Winter Simulation Conference; 2007; pp. 815-822; 8 pages.

Guoqing Xu, et al.; "A Basic Model for Components Implementation of Software Architecture"; ACM, SIGSOFT Software Engineering Notes; 2004; 11 pages.

* cited by examiner

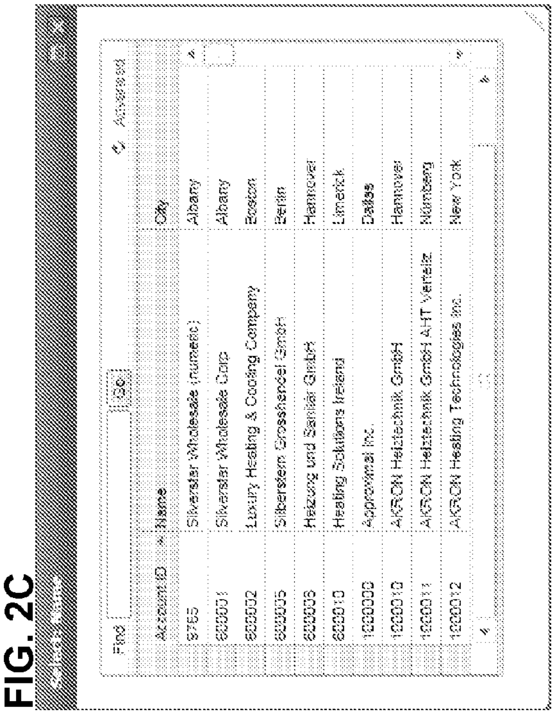

FIG. 2C

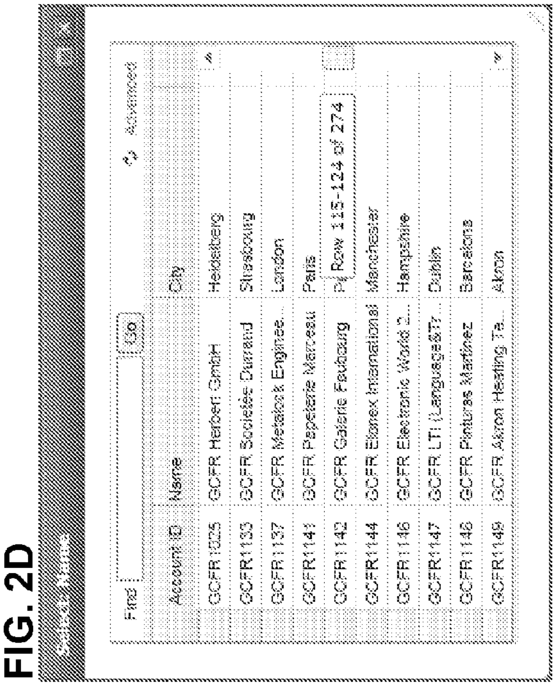

FIG. 2D

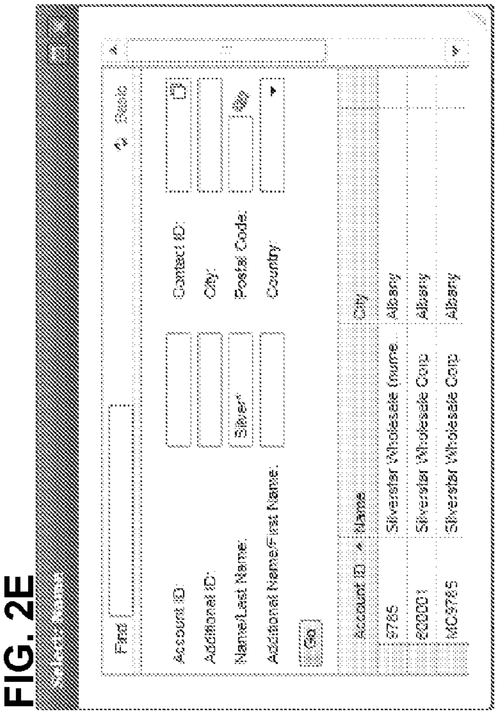

FIG. 2E

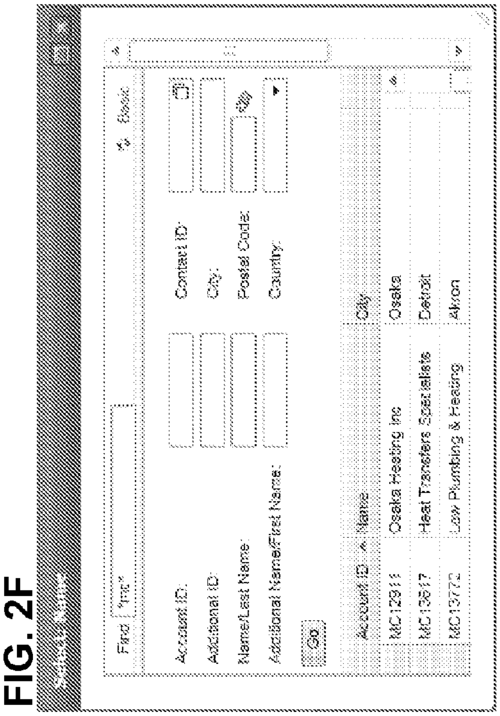

FIG. 2F

| Account ID | * Name | City |
|---|---|---|
| 9785 | Silverstar Wholesale (nume...) | Albany |
| 803001 | Silverstar Wholesale Corp | Albany |
| 803002 | Luxury Heating & Cooling Company | Boston |
| 803005 | Silberstern Grosshandel GmbH | Berlin |
| 803008 | Heizung und Sanitär GmbH | Hannover |
| 803010 | Heating Solutions Ireland | Limerick |
| 1020000 | Approximat Inc. | Dallas |
| 1020010 | AKRON Heiztechnik GmbH | Hannover |
| 1020011 | AKRON Heiztechnik GmbH AHT Vertrieb | Nürnberg |
| 1020012 | AKRON Heating Technologies Inc. | New York |

| Account ID | Name | City |
|---|---|---|
| GCFR1025 | GCFR Herbert GmbH | Heidelberg |
| GCFR1133 | GCFR Societee Durand | Strasbourg |
| GCFR1137 | GCFR Metalock Enginee... | London |
| GCFR1141 | GCFR Papéterie Marceau | Paris |
| GCFR1142 | GCFR Galerie Faubourg | |
| GCFR1144 | GCFR Elionex International | Manchester |
| GCFR1146 | GCFR Electronic World 2... | Hampshire |
| GCFR1147 | GCFR LTI (Language&T... | Dublin |
| GCFR1148 | GCFR Pinturas Martinez | Barcelona |
| GCFR1149 | GCFR Akron Heating Te... | Akron |

Row 115-124 of 274

Account ID:
Additional ID:
Name/Last Name:
Additional Name/First Name: Silver*

Contact ID:
City:
Postal Code:
Country:

| Account ID | * Name | City |
|---|---|---|
| 9785 | Silverstar Wholesale (num... | Albany |
| 803001 | Silverstar Wholesale Corp | Albany |
| MC9785 | Silverstar Wholesale Corp | Albany |

Account ID:
Additional ID:
Name/Last Name:
Additional Name/First Name:

Contact ID:
City:
Postal Code:
Country:

| Account ID | * Name | City |
|---|---|---|
| MC12911 | Osaka Heating Inc | Osaka |
| MC13617 | Heat Transfers Specialists | Detroit |
| MC13772 | Low Plumbing & Heating | Akron |

FIG. 5B
Class Source(M) Edit Goto Utilities Environment System Help
SAP
Source Code-Based Class Builder Class CL_FSI_BUPA_SEL_MAPPI
Pattern
Pretty Printer
Class Source
Active
IF sy-subrc IS INITIAL.
IF ls_selection_ts-low LT ls_selection_ts-high.
MOVE ls_selection_ts-low TO lv_createdate_low.
CONVERT DATE lv_createdate_low
INTO TIME STAMP lv_createts_low TIME ZONE 'UTC '.
IF NOT ls_selection_ts-high IS INITIAL.
MOVE ls_selection_ts-high TO lv_createdate_high.
CONVERT DATE lv_createdate_high TIME lc_maxtime
INTO TIME STAMP lv_createts_high TIME ZONE 'UTC '.
ENDIF.
ls_selection_ts-fieldname = 'CREATION_DATE_TIME'.
IF ls_selection_ts-op IS INITIAL.
ls_selection_ts-op = 'BT'. "given-date or late-date is searched
ENDIF.
IF ls_selection_ts-high IS INITIAL.
ls_selection_ts-op = 'EQ'.
ENDIF.
ls_selection_ts-low = lv_createts_low.
ls_selection_ts-high = lv_createts_high.
IF ls_selection_ts-rowtype = 'ATTRIBUTE'.
ls_selection = ls_selection_ts.
ls_selection-fieldname = iv_createdatetime.
APPEND ls_selection TO ct_selection.
ELSE.
APPEND ls_selection_ts TO ct_selection.
ENDIF.
ELSEIF ls_selection_ts-low EQ ls_selection_ts-high.
Scope \CLASS CL_FSI_BUPA_SEL_MAPPING_QRS\METHOD add_creat
ABAP
Ln 1502 Col 23
NUM
AKR (1) 100
ldclakr
INS

| Number | BO/BOPF | FSI/TREX |
|---|---|---|
| 1 | Foreign Key | Join Condition |
| 2 | Constant | Restriction Rule |
| 3 | Filter | Restriction Rule with placeholder / Constraint |

1) Selection: Get all node_ids

| Number | NODE_ID | | | | | | | | | | | |
|---|---|---|---|---|---|---|---|---|---|---|---|---|
| 1 | | | | | | | | | | | | |
| 2 | | | | | | | | | | | | |
| … | | | | | | | | | | | | |
| 49 | | | | | | | | | | | | |
| 50 | | | | | | | | | | | | |
| 51 | | | | | | | | | | | | |
| … | | | | | | | | | | | | |
| 276 | | | | | | | | | | | | |

| Attributes | 1 | 2 | 3 | 4 | 5 | 6 | 7 | 8 | … | 151 | 152 | 153 |
|---|---|---|---|---|---|---|---|---|---|---|---|---|

FIG. 7A

| | | | |
|---|---|---|---|
| ▷ ⌘ :Call M. CL_OBERON_MASTER_CONTROLLER=>EXECUTE_COMMAND_QUEUE: | 9 | (363.521) | 13 |
| ▷ ⌘ Call M. {O:2970*CL_OBERON_MC_GET_VALUE_HELP}->IF_OBERON_MASTER_COMMAND~EXECUTE | 10 | 363.508 | 179 |
| ▷ ⌘ Call M. {O:2968*CL_SALV_SFD_DATA_SOURCE}->IF_SALV_CSL_DATA_PROVIDER~GET_SIZE | 16 | 87.515 | 6 |
| ⌘ Call M. {O:2968*CL_SALV_SFD_DATA_SOURCE}->IF_SALV_CSL_DATA_ACCESSOR~GET_SIZE | 17 | 87.509 | 29 |
| 🗒 Call M. {O:2967*CL_SALV_CSQ_LOG}->IF_SALV_CSQ_LOG~LOG_TASK_BEGIN | 18 | 4 | 4 |

1) Get NodeIDs ⌘ Call M. {O:2259*CL_FSI_TREX_QE}->CALL_TREX

| | | | |
|---|---|---|---|
| 🗒 Call M. {O:2277*CL_FSI_ABSTRACT_RT_PROXY}->IF_FSI_VIEW_RT_PROXY~GET_DEF_RT_RE | 54 | 23.746 | 754 |
| 🗒 Call M. {O:2285*LCL_NULL_COLLECTOR}->IF_FSI_PERFORMANCE_COLLECT~START | 55 | 21 | 21 |
| 🗒 DB Buffer. Get TABLP GET | 55 | 8 | 8 |
| 🗒 Load Report SAPLTREX_EXT_TM | 55 | 29 | 29 |
| ▷ ☐ :Call Function TREX_EXT_SEARCH_CELL_TABLE: | 55 | 164 | 164 |
| 🗒 Call M. {O:2285*LCL_NULL_COLLECTOR}->IF_FSI_PERFORMANCE_COLLECT~END | 55 | (22.760) | 266 |
| 🗒 Call M. {O:2285*LCL_NULL_COLLECTOR}->IF_FSI_PERFORMANCE_COLLECT~START | 55 | 2 | 2 |
| 🗒 Call M. {O:2285*LCL_NULL_COLLECTOR}->IF_FSI_PERFORMANCE_COLLECT~END | 55 | 7 | 7 |
| | 55 | 1 | 1 |

| | | | |
|---|---|---|---|
| ▷ ⌘ Call M. {O:2202*CL_SALV_CSL_DATA_CONTAINER}->IF_SALV_CSL_DC_BUNDLE~GET_DATA | 17 | (241.762) | 6 |
| ⌘ Call M. {O:2968*CL_SALV_SFD_DATA_SOURCE}->IF_SALV_CSL_DATA_ACCESSOR~GET_DATA | 18 | 241.756 | 39 |

2) Retrieve data ▷ ⌘ Call M. {O:2051*CL_FSI_TREX_QE}->CALL_TREX

| | | | |
|---|---|---|---|
| 🗒 Call M. {O:2127*CL_FSI_ABSTRACT_RT_PROXY}->IF_FSI_VIEW_RT_PROXY~GET_DEF_R | 50 | 62.750 | 387 |
| 🗒 Call M. {O:2285*LCL_NULL_COLLECTOR}->IF_FSI_PERFORMANCE_COLLECT~START | 51 | 20 | 20 |
| ▷ ☐ :Call Function TREX_EXT_SEARCH_CELL_TABLE: | 51 | 9 | 9 |
| 🗒 Call M. {O:2285*LCL_NULL_COLLECTOR}->IF_FSI_PERFORMANCE_COLLECT~START | 51 | (62.324) | 126 |
| 🗒 Call M. {O:2285*LCL_NULL_COLLECTOR}->IF_FSI_PERFORMANCE_COLLECT~END | 51 | 2 | 2 |
| 🗒 Call M. {O:2285*LCL_NULL_COLLECTOR}->IF_FSI_PERFORMANCE_COLLECT~START | 51 | 7 | 7 |
| 🗒 Call M. {O:2285*LCL_NULL_COLLECTOR}->IF_FSI_PERFORMANCE_COLLECT~END | 51 | 1 | 1 |

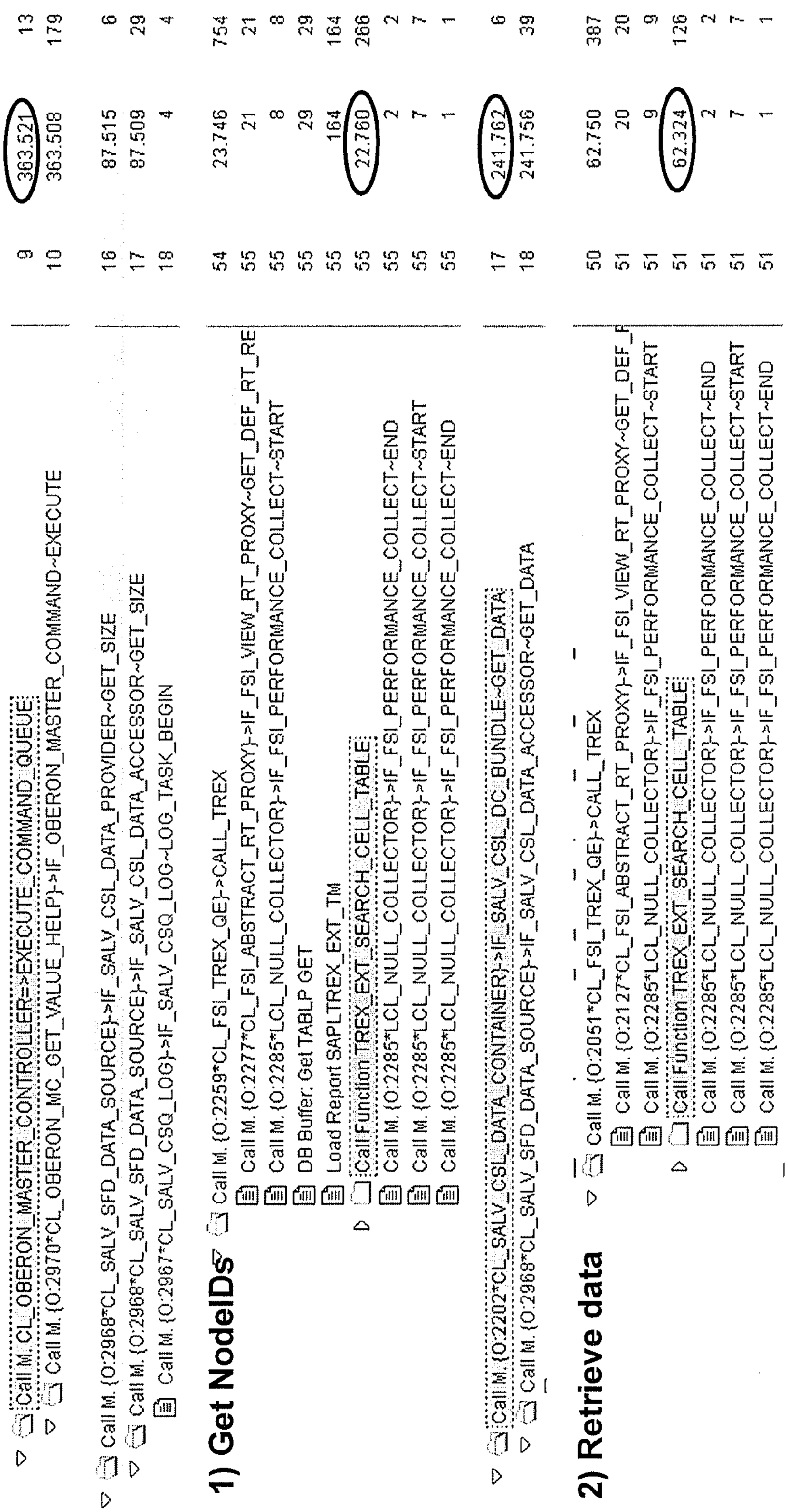

FIG. 7C

Selection and Retrieval in one step ( 4 requested Attributes = Output )

| Number |
|---|
| 1 |
| 2 |
| ... |
| 49 |
| 50 |
| 51 |
| ... |
| 276 |

Range from 1-50

| NODE_ID |
|---|
|  |
|  |
|  |
|  |
|  |
|  |
|  |
|  |

| Attributes | 1 | 2 | 3 | 4 | 5 | 6 |
|---|---|---|---|---|---|---|

4 requested Attributes

| | | |
|---|---|---|
| Call M. CL_OBERON_MASTER_CONTROLLER=>EXECUTE_COMMAND_QUEUE | | |
| Call M. {O:2970*CL_OBERON_MC_GET_VALUE_HELP}->IF_OBERON_MASTER_COMMAND~EXECUTE | 9 | 34.025 | 13 |
| | 10 | 34.012 | 111 |
| Call M. CL_ABAP_TABLEDESCR=>CREATE | 14 | 76 | 11 |
| Call M. {O:2992*CL_BSA_SADL_QUERY_QE_ADAPTER_}->MERGE_CONDITIONS | 14 | 85 | 82 |
| Call M. {O:2992*CL_BSA_SADL_QUERY_TREX_ADAPTE_}->EXECUTE | 14 | 24.741 | 217 |
| Call M. {O:2992*CL_BSA_SADL_QUERY_TREX_ADAPTE_}->MAP_CONDITIONS | 15 | 173 | 85 |
| Load Report CL_BSA_QUERY_CONDITION_MAPPER=CP | 15 | 40 | 40 |
| Call M. CL_BSA_QUERY_CONDITION_MAPPER=>GET_INSTANCE | 15 | 7 | 5 |
| Call M. {O:2999*CL_BSA_QUERY_CONDITION_MAPPER}->MAP_SEARCH_TEXT | 15 | 15 | 15 |
| Load Report CL_GFS_TREX_INDEX_FACTORY=CP | 15 | 24 | 24 |
| Create ABAP Object CL_GFS_TREX_INDEX_FACTORY | 15 | 2 | 2 |
| Call M. {O:3000*CL_GFS_TREX_INDEX_FACTORY}->CONSTRUCTOR | 15 | 92 | 9 |
| Call M. {O:3000*CL_GFS_TREX_INDEX_FACTORY}->GET_DESTINATION | 15 | 2 | 2 |
| Load Report SAPLTREX_EXT_TM | 15 | 74 | 74 |
| Call Function TREX_EXT_SEARCH_CELL_TABLE | 15 | 24.095 | 269 |

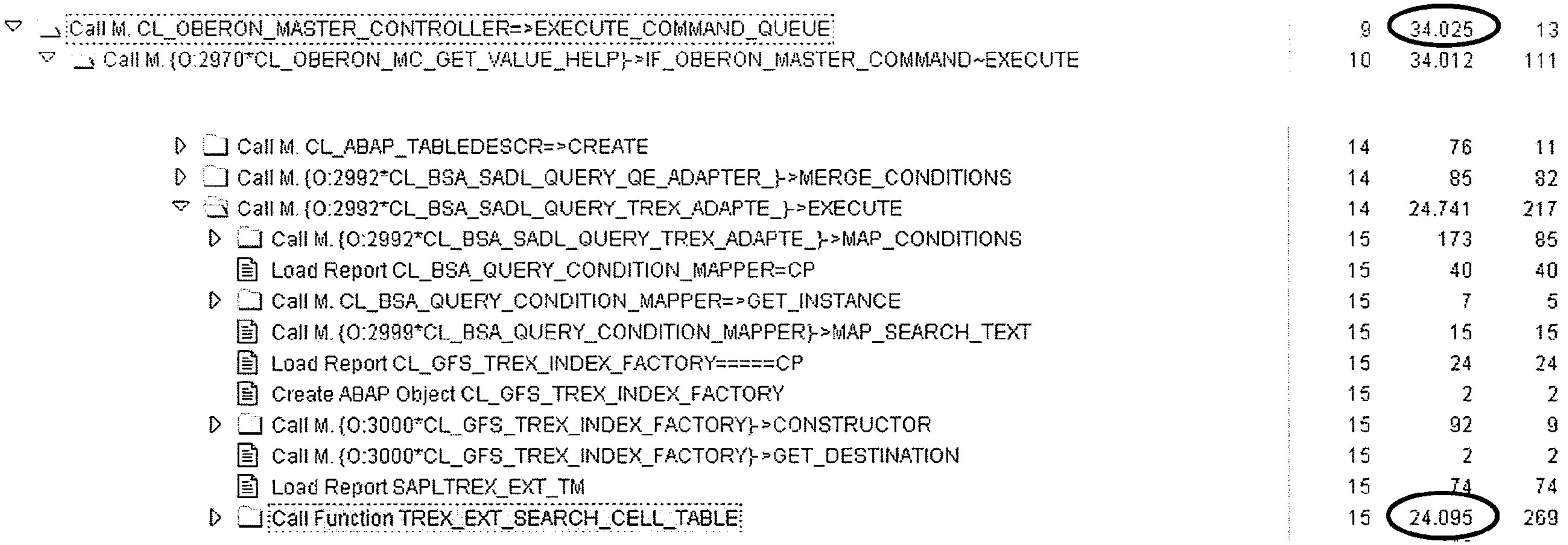

FIG. 8D

SADL QUERY VIEW—A MODEL-DRIVEN APPROACH TO SPEED-UP READ-ONLY USE CASES

BACKGROUND

The present invention relates to computing, and in particular, to a systems and methods for a model-driven database query, that allows a development/design-time tool to permit the developer to create the query based upon business objects and their associations.

Unless otherwise indicated herein, the approaches described in this section are not prior art to the claims in this application and are not admitted to be prior art by inclusion in this section.

Databases are highly useful tools allowing users to manage complex relationships between different types of data. FIG. 1 shows a highly simplified view of a system 100 comprising a human user 102 who is in communication with a database 104 through an intervening user interface (UI) 106. When a large volume of data is requested to be read and returned from the database 104, in general the UI 106 will formulate and pose a query 108 having features 109, to the database.

FIG. 2A shows an example of a screen shot 200 of a user interface posing such a query. In particular, the location of the arrow cursor 202 indicates the user to be seeking a list of existing account names in a window 204 devoted to responding to potential new business opportunities.

FIG. 2B shows the information 206 returned from the database as a result of this query. This information 206 includes data fields relating to a plurality of existing accounts 208. The data fields include the name 210 of the existing account, the identifier (ID) 212 of the existing account, and the location (city) 214 of the existing account.

As shown in FIGS. 2C-2G, the query has a number of features allowing manipulation of the data that has been read from the database. For example, FIG. 2C shows a sorting feature allowing the user to manipulate the returned data by a field type, here the Account ID 212.

FIG. 2D shows yet another query feature, that of paging. This query feature governs the manner in which the returned data is displayed to a user by the user interface. Typically, returned data is restricted to a 'page' to be shown to the user, instead of returning all data, which would be inefficient. Here, the paging feature has displayed only rows 115-124 out of a total of 274 rows that were responsive to the query.

FIG. 2E shows the query feature of selection. This query feature allows a user to identify portions of the returned data corresponding to selected input within a particular field, here accounts having 'Silver' in the account name field 210. The query feature of selection also allows ranges of values, and selection in the positive (Including) or the negative (Excluding).

FIG. 2F shows the query feature of search. This query feature allows a user to identify portions of the returned data corresponding a search term, here any field containing the term "mc".

FIG. 2G shows the query feature of filtering. Filtering is similar to the query feature of selection, but is more limited in application. In particular, filtering restricts the display of rows and columns already returned by searching, to those having the filter values.

Conventionally, it may be challenging to design a user interface that is able to interact in an effective and efficient manner with the underlying database. One reason for this is the large number of intervening layers actually present between the UI and the underlying data of the database.

FIG. 3 depicts an example of such a multi-layer architecture 300, showing the various layers 302, 304, 306, 308, and 310 that are implicated in a query from the user seeking to read data from the database. A single, individual software developer may be familiar with the structure/language of fewer than the full complement of these layers. Accordingly, multiple developers and tools are typically required to create an effective UI, and particularly to create a UI capable of posing queries that are efficiently processed by the various layers.

For example, FIG. 1 shows the creation of query structure 110 having the features 109, utilizing a model 112 of database-level concepts such as tables, logical grouped tables, modeled relationships between tables, views, joins, indexes, and restriction rules/constraints. In order to function effectively, however, such a query structure may also need to consider the structure and attributes of intervening levels, thereby complicating development efforts.

The present disclosure addresses these and other issues with systems and methods for a model-driven database query that allows a development/design-time tool to permit the developer to create a query based upon business objects and their associations.

SUMMARY

Embodiments of the invention relate to computing, and in particular, to a systems and methods for a querying a database. Certain embodiments implement a model-driven database query ("the SADL query") facilitating a design-time tool that allows a developer to create the query based upon existing Business Objects (BOs) and their associations. This SADL query leverages mapping between business-layer entities and database-layer entities, such mapping being derived from association metadata already extant in the model used to create the Business Objects. In certain embodiments, query views may be based upon associations present within the business layer, rather than upon database-level entities (such as joins or restriction rules) typically relied upon for conventional query creation. Embodiments of the present invention may thus align query creation more closely with the structure of the business layer, and may also render query design agnostic relative to the identity of the underlying database. In certain embodiments, a SADL Query may provide an XML syntax to put query aspects into one artifact from a modeling perspective, instead of using multiple tools and multiple repositories.

An embodiment of a computer-implemented method according to the present invention comprises providing a database comprising a plurality of database-level entities, referencing a business model to create a business layer in communication with the database, the business layer comprising a plurality of business-level entities including at least one association, wherein the business model includes association metadata, providing a user interface in communication with the business layer, referencing the business model to create a query of the database, the query including mappings derived from the association metadata, and causing the user interface to execute the query and return corresponding data read from the database.

An embodiment of a non-transitory computer readable storage medium according the present invention embodies a computer program for performing a method comprising, providing a database comprising a plurality of database-level entities, referencing a business model to create a business layer in communication with the database, the business layer comprising a plurality of business-level entities including at least one association, wherein the business model includes association metadata, providing a user interface in communication with the business layer, referencing the business model to create a query of the database, the query including mappings derived from the association metadata; and causing the user interface to execute the query and return corresponding data read from the database.

An embodiment of a computer system in accordance with the present invention comprises one or more processors, and a software program, executable on said computer system, the software program configured to provide a database comprising a plurality of database-level entities, reference a business model to create a business layer in communication with the database, the business layer comprising a plurality of business-level entities including at least one association, wherein the business model includes association metadata, provide a user interface in communication with the business layer, reference the business model to create a query of the database, the query including mappings derived from the association metadata, and cause the user interface to execute the query and return corresponding data read from the database.

In certain embodiments the association is used to create a query view.

In certain embodiments a business-level entity comprises a foreign-key relationship corresponding to a database-level join condition entity.

In certain embodiments a business-level entity comprises a resolving node having attributes bound to constant values corresponding to a restriction rule in the database.

In certain embodiments, a business-level entity comprises a resolving node having attributes bound to a filter parameter corresponding to a restriction rule with a placeholder in the database.

In certain embodiments, the query is delegated to the database-level.

The following detailed description and accompanying drawings provide a better understanding of the nature and advantages of the present invention.

BRIEF DESCRIPTION OF THE DRAWINGS

FIGS. 2C-2G show query features.

FIG. 6AB shows a simplified flow of an embodiment of a method according to the present invention.

FIG. 6BB shows the mapping between database level entities and business level entities in this first example.

FIGS. 7A-B depict steps of a conventional query in an example.

FIG. 7C presents a detailed view of the callstack of the conventional query in the example.

FIGS. 8B-D show a runtime callstack of a query according to an embodiment of the present invention, in the example.

DETAILED DESCRIPTION

Figure 1:
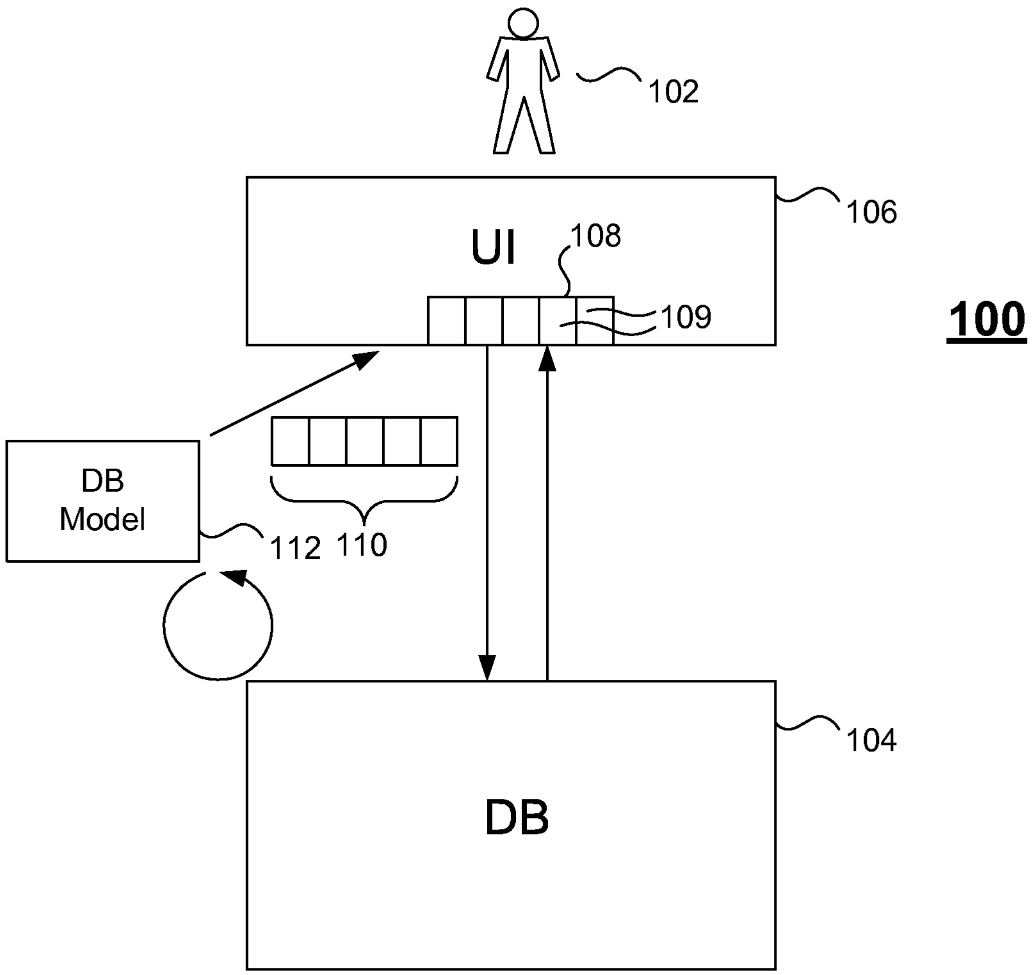
FIG. 1 shows a generic view of interaction of a user with a database through a user interface.

Described herein are techniques for a model-driven database query that allows a development/design-time tool to permit the developer to create a query based upon business objects and their associations within the UI designer tool, and also to avoid the necessity of using DB level entities such as joins.

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention relate to a model-driven database query that allows a development/design-time tool to permit the developer to create a query based upon business objects and their associations. Particular embodiments are based upon a modeling of business level entities using the Business Objects (BO)-related domain specific language SADL, as described in the U.S. Nonprovisional patent application Ser. No. 12/648,216 filed Dec. 28, 2009 and issued on Feb. 26, 2013 as U.S. Pat. No. 8,387,030, which is incorporated by reference in its entirety herein for all purposes. This allows the mapping of the business level entities (nodes, associations, filters) to the technical entities (tables, joins, constraints) of a Query or Search Engine like TREX or any Database, to be performed by the compiler processing the SADL code.

Querying approaches according to embodiments of the present invention may avoid certain issues arising from conventional querying. This is now described in connection with the conventional query runtime callstack depicted in FIGS. 4A-B.

The exemplary query of these figures relates to one posed to the ByDesign software available from SAP AG, where the following acronyms are defined as follows:

Oberon=Backend and Frontend component for the User Interface Layer;

ALV=ABAP List Viewer

ACP=ABAP client proxy: API of the Service Layer consumed by Oberon;

BSA++=Backend Service Adaptation;

ECO=Enhanced Controller Object;

FSI=Fast Search Infrastructure;

TREX=an in-memory technology as secondary persistence to allow fast search queries.

ABAP List Viewer is a general service to display table content and enable search. For ByDesign (ByD) it was used to cache data to be displayed on the UI. Since formatting options for the values (like date time with timezone, etc) are known by ALV, filtering and sorting could be done. But, all data therefore had to be loaded into the memory. If sorting of a column was triggered by the user, all data has to be loaded into memory, since the DB does not know the formatting, then the sorting can be performed, and afterwards the data can be send to the UI. Without ALV we enable sorting and searching by supporting all data types (CCTS).

Figure 4B:
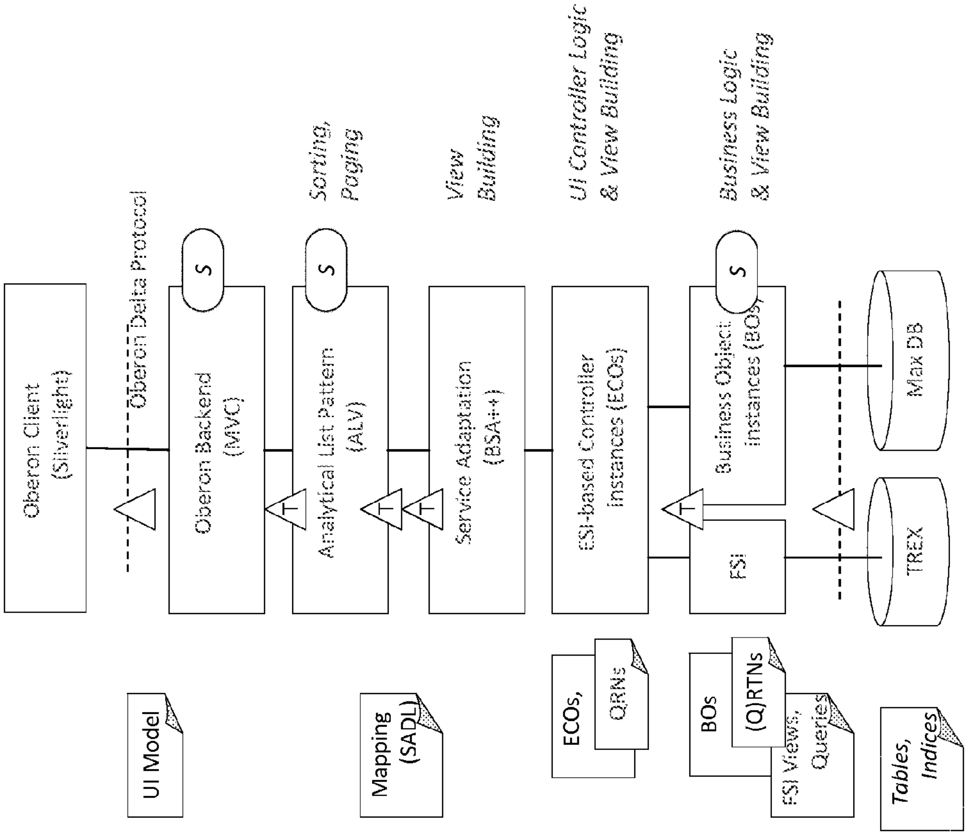
FIGS. 4A-B show a runtime callstack of a conventional query.
Figure 4A:
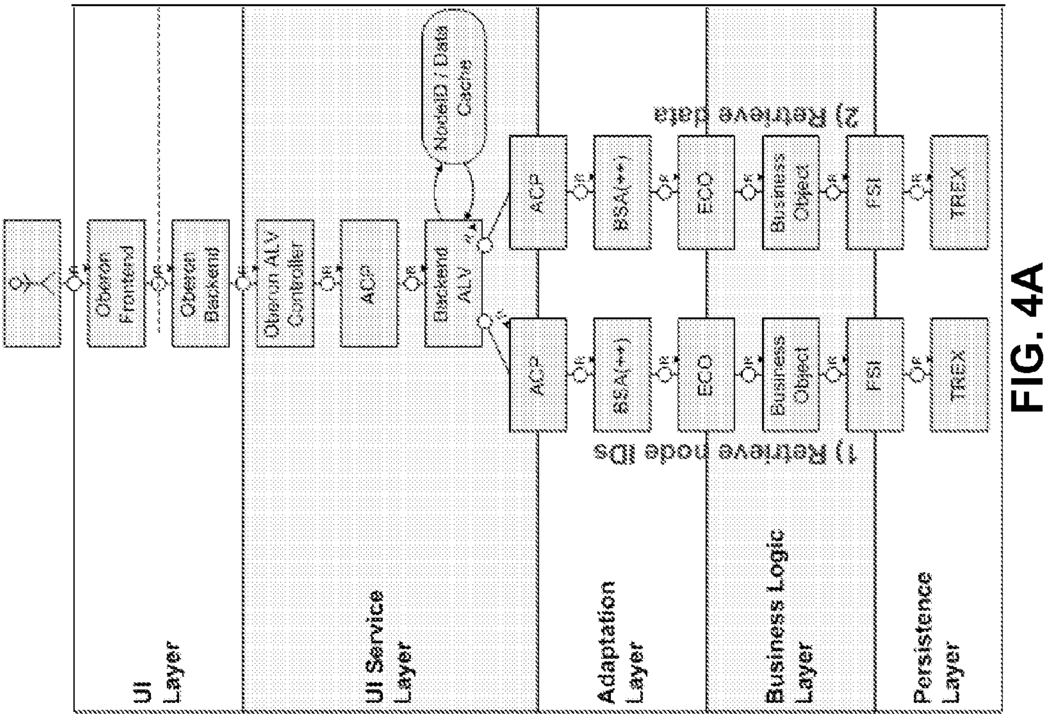

One issue presented by the conventional querying approach, is the excess storage of information. In FIG. 4B, "S" indicates instances of the redundant buffering of results in the runtime callstack. Such redundant buffering may be associated with a corresponding delays and consumption of memory. For example, in the ABAP List Viewer data is always loaded into memory to execute a sorting search, rather than being delegated to the database.

Another issue revealed by the runtime callstack of the conventional query is the high frequency of transformations (triangles "T"), as data read from the database is moved upward to the UI. FIG. 4B shows multiple such transformations occurring for each conventional callstack, with each transformation consuming processing resources and time.

Still another issue associated with the conventional querying approach is the use of different techniques for view building in the various layers. Examples of such different techniques include SADL, QRNs, and FSI.

FIG. 4B also shows certain activities (such a querying and view building), as occurring at too high a level in the conventional query callstack to afford efficient processing. For example, sorting and paging occur in the ALV instead of being performed in the database.

Conversely, FIG. 4B shows other activities as occurring at too low a level in the conventional query callstack to afford efficient processing. For example, the ESI-based implementation of UI controller logic occurs so low in the callstack, that it is always stateful. FIG. 4B also shows normalized business objects instantiated at runtime, even though mostly views are required. Again, these inefficiencies can degrade query performance.

Figure 5A:
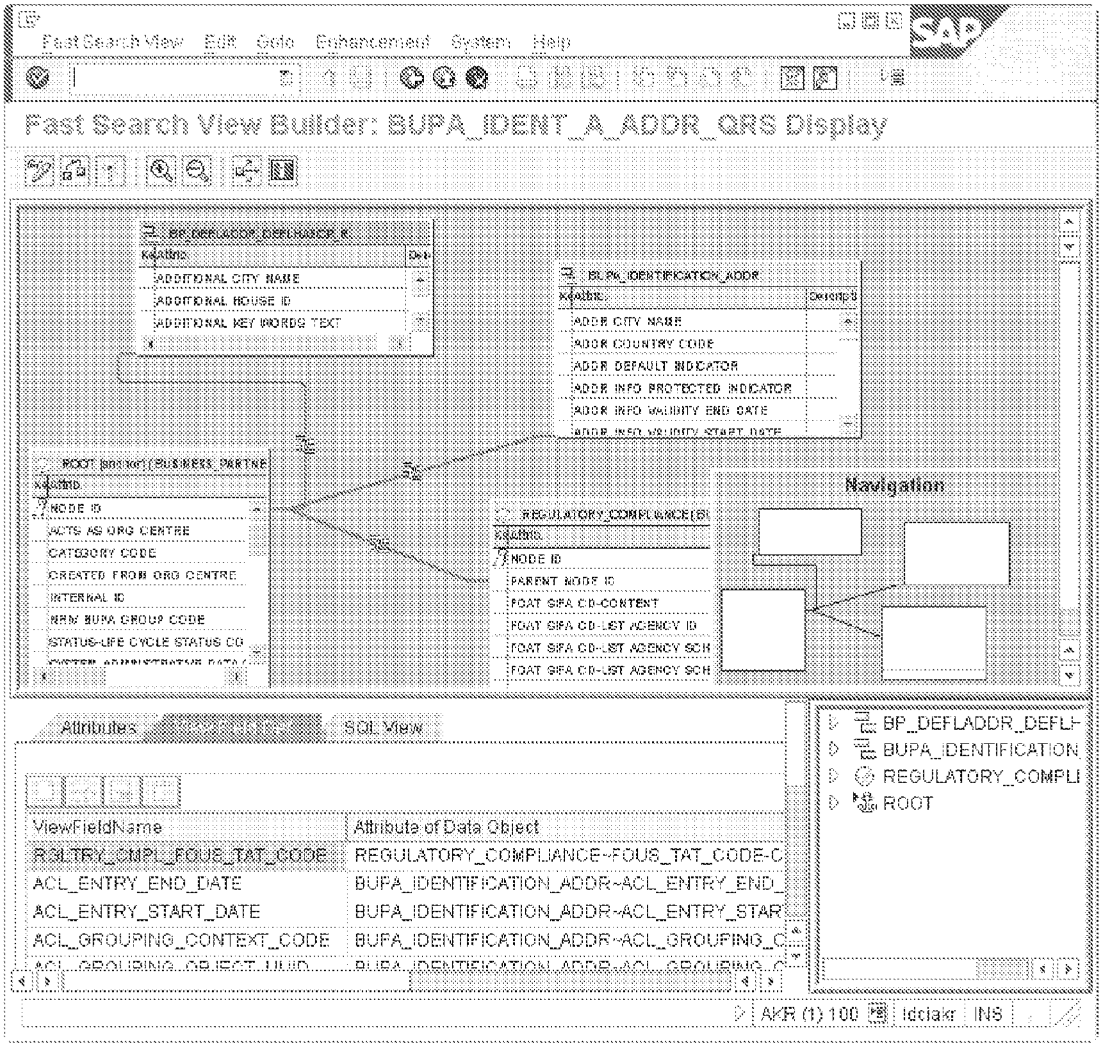
FIG. 5A shows a conventional separate database level view model.

FIG. 4B further shows the need to use multiple models in conventional query design. For example, apart from the already existing UI model and the Business Objects (BO) model, the conventional query design further requires a separate model for views on the database level, as shown in FIG. 5A. This model is redundant, leading to unwanted consumption of overhead, and can also lead to inconsistencies.

Figure 5B:
FIG. 5B shows a conventional separate database level query model.

Moreover, conventional query design also requires a separate model for queries, as shown in FIG. 5B. This model, which investigates entities on the database level, serves to convert input parameters to allow for comparison with persisted values, but it creates complex conditions and results in reuse of mapping.

Figure 5C:
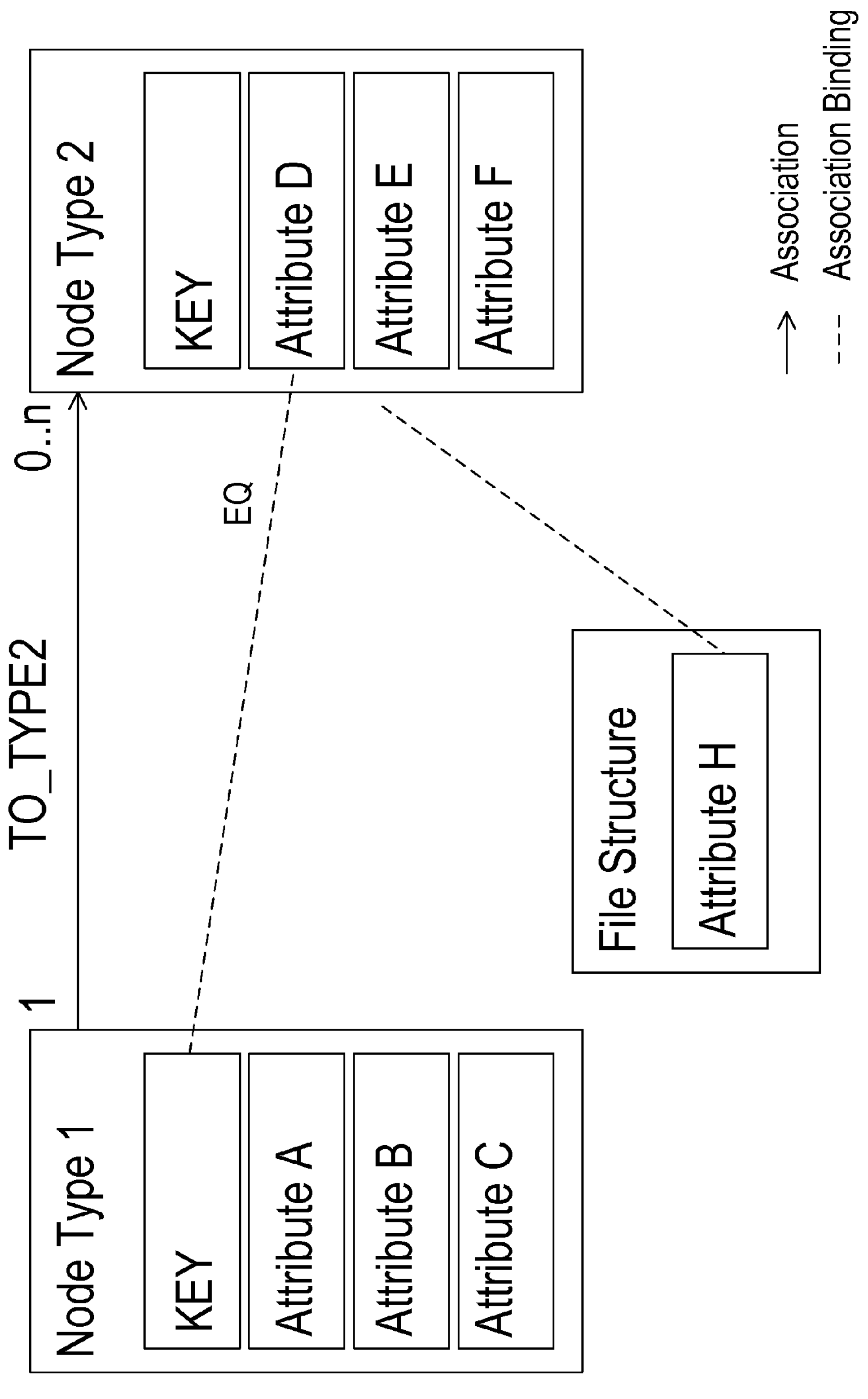
FIG. 5C shows a simplified view of conventional association modeling on the database level.

For example, FIG. 5C shows a simplified view of conventional association modeling on the database level. Such association modeling capabilities may be restricted to the definition of the filter input parameter and the foreign-key relationships. In the event that more information for the definition of an association is needed, such definition needs to be implemented via a specialized, database-level language in which the UI developer may not be fluent. While this figure shows how an association is modeled, this modeling is not used for the view definition. However, this information can directly be mapped to the DB level entities without using redundant information and doing the same mapping again.

Figure 6A:
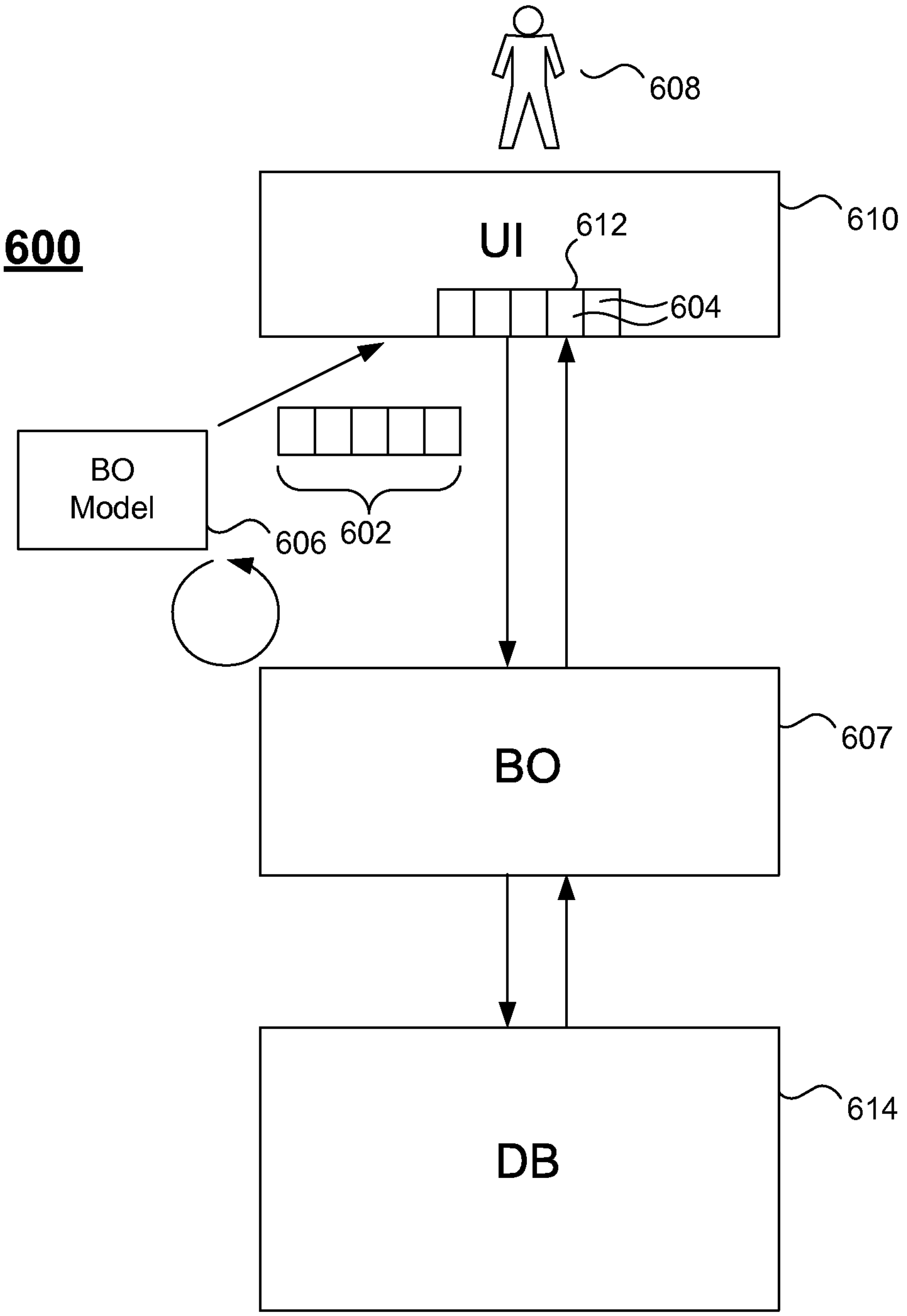
FIG. 6AA shows in highly simplified form, a system wherein a query structure having features is created utilizing the Business Objects model that is based upon investigation of the business objects layer.
Figure 6A:
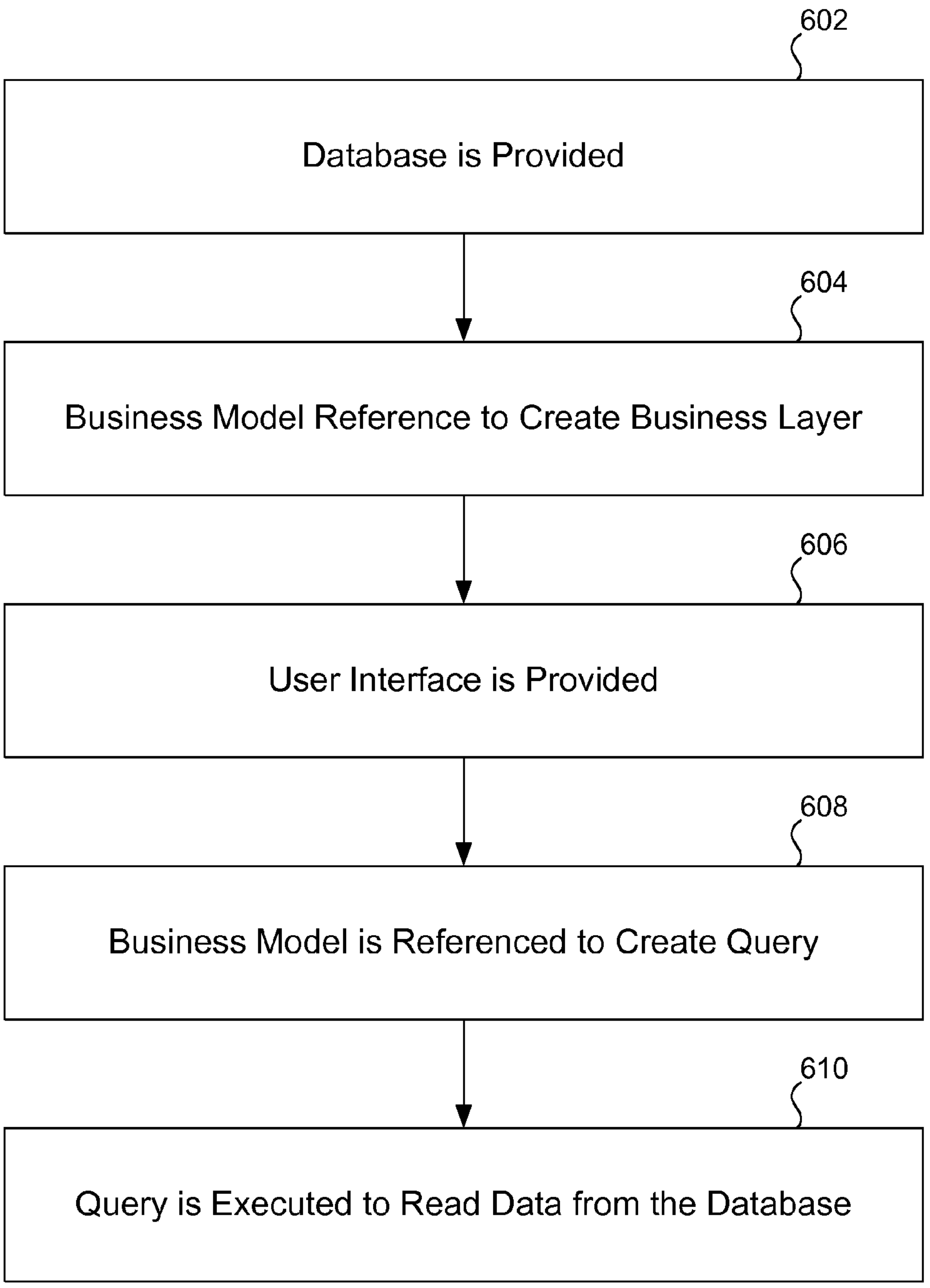

By contrast, embodiments of the present invention utilize a model-driven database query allowing a development/design-time tool to permit the developer to create a query based only upon the existing Business Objects (BO) model, and in particular upon the various business objects and their associations. FIG. 6AA shows in highly simplified form, a system 600 wherein a query structure 602 having features 604, is created utilizing the Business Objects model 606 that is based upon investigation of the business objects layer 607. A user 608 can then access the user interface 610 to generate a specific query 612 having the features 604, to return data from the database 614.

Query creation according to embodiments of the present invention, leverages off of mappings between entities of the business layer and entities of the database layer. Such mappings are derived from association metadata that has already been created as part of the business objects model.

The following table provides a listing of some of these mappings.

| Database Level Entity | Business Level Entity |
|---|---|
| Logical grouped tables | Business Object |
| Table | Business Object Node |
| View | (FSI) View |
| Modeled Relationships between tables | Associations |

According to embodiments of the present invention, since the associations of the business level have already been created as modeled relationships between the nodes, these associations can also be used to provide the view needed for the query. Such an approach eliminates redundant usage of joins/restrictions in view definition.

FIG. 6AB shows a simplified flow 600 of an embodiment of a method according to the present invention. In a first step 602, a database is provided comprising a plurality of database-level entities. In a second step 604, a business model is referenced to create a business layer in communication with the database, the business layer comprising a plurality of business-level entities including at least one association, wherein the business model includes association metadata. In a third step 606, a user interface is provided in communication with the business layer. In a fourth step 608, the business model is referenced create a query of the database, the query including mappings derived from the association metadata. In a fifth step 610, the user interface is caused to execute the query and return corresponding data read from the database.

Example #1

The Fast Search Infrastructure (FSI) is an existing infrastructure having tools to define a user and a query, based upon the database level. In certain approaches, these entities may be generated based on one SADL variant.

However, SADL Queries according to embodiments of the present invention may now go directly to the in-memory DB TREX, without any FSI involvement during design or runtime. Embodiments of the present invention offer a way for the developer to model (DB-like) views on Business Object nodes. The view modeling is supported across different transactions and UIs. FSI additionally provides a consumer API to create views programmatically.

Figure 6B:
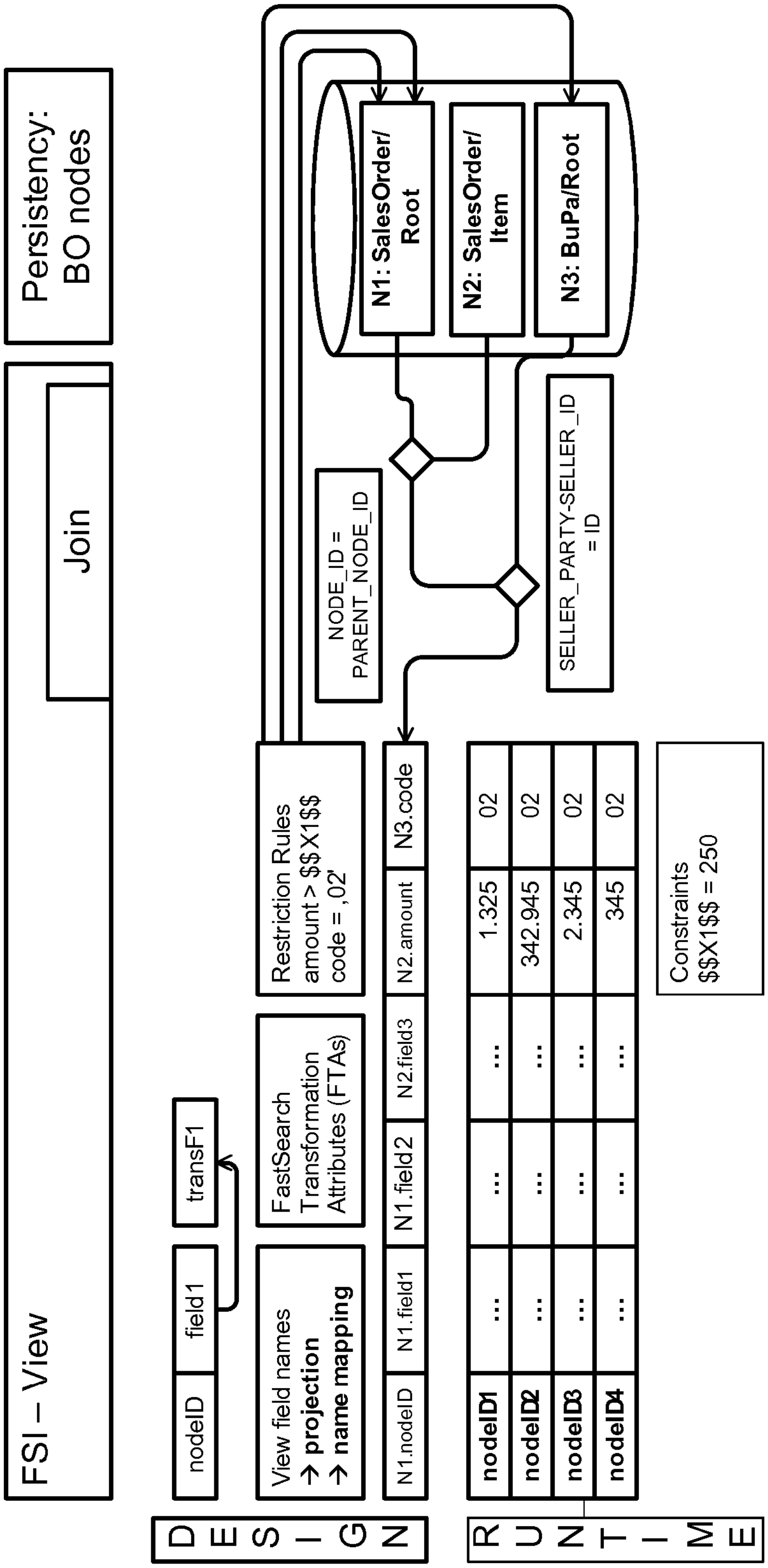
FIG. 6BA presents a simplified schematic view of operation of a first example according to an embodiment of the present invention.
Figure 6B:
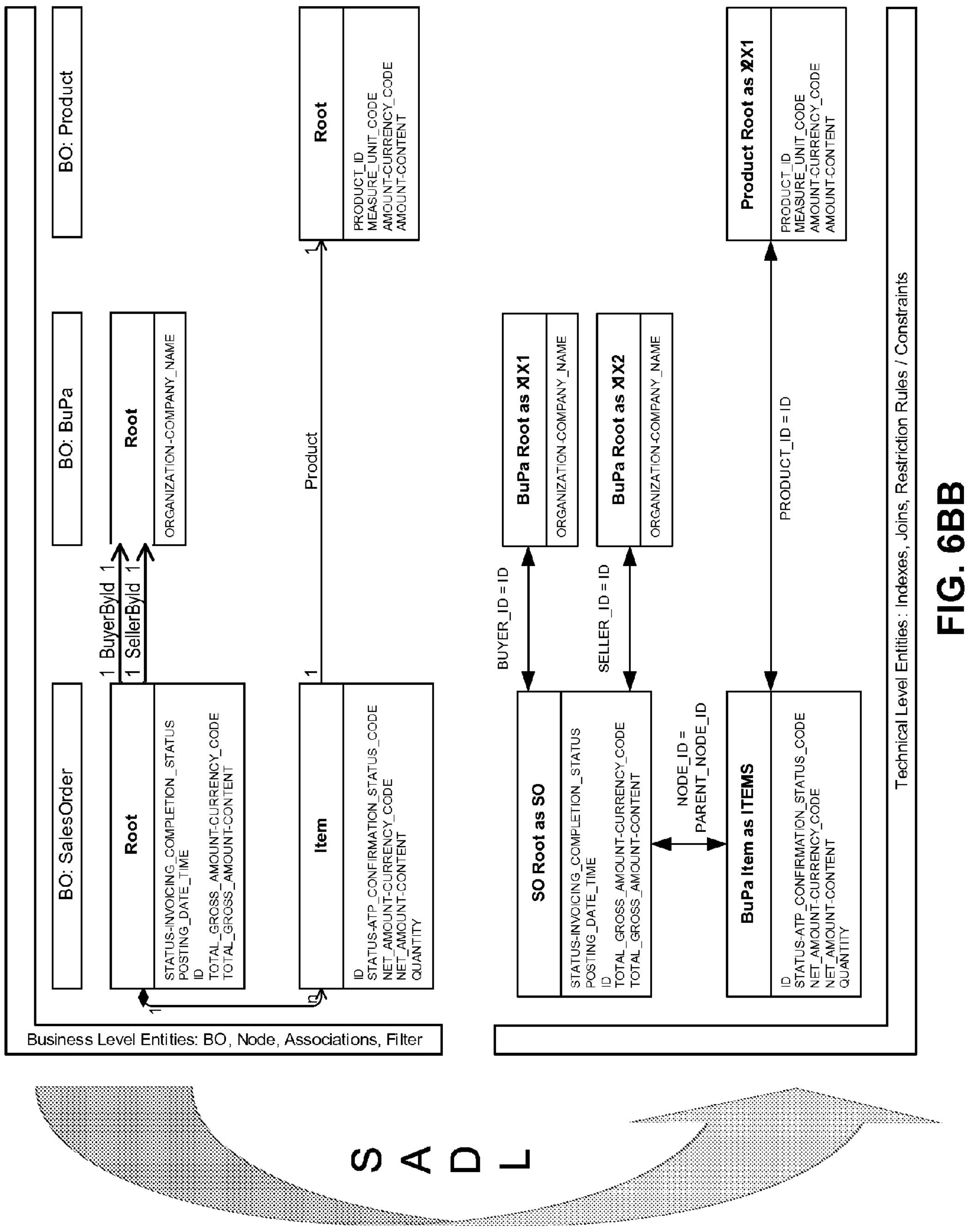

Operation of the FSI is now discussed in connection with FIG. 6BA. During design time, the developer creates an FSI View by defining joins between BO nodes and restricting the node instances to those that fulfill a certain condition (Restriction Rules). Some fields of the view can be calculated by applying a transformation based on other fields.

The following concepts are relevant to design time. First, an FSI-View covers a set of BO nodes (or other FSI views) that will be joined.

Second, the Join connects the BO nodes (or FSI views) via join conditions (re-modeling the foreign key relationship of BO associations). FSI supports the inner join and left outer join type, within a single view only one join type is allowed. Each join condition is based on the equals comparator: N1.PK=N2.FK. Each join can include multiple conditions via and relation: F1=F2 and F3=F4.

Third, the first set of view fields is modeled in the View Field Names list referring to the BO node attributes, these view fields have to be bound to a flat BO node attribute (e.g. ID-CONTENT).

Projection: Which BO node attributes are relevant?

Name Mapping: Mapping the BO node attribute name to a view field name

Fourth, the calculated view fields are modeled as Fast-Search Transformed Attributes (FTAs):

FTAs are determined by applying a transformation (e.g. FTA type UTC_TO_LOCAL_DATE)

FTA parameters are view field

Fifth, Restriction Rules are based on View Fields and select relevant records/instances (designed statically and processed during runtime). A Restriction Rule is a condition related to a field: F1{=, < >, <, <=, >, >=}<value>. Restriction Rules are executed on the BO node instances during runtime before the join conditions are evaluated. The Restriction Rules can be based on a constant value or on placeholders, whereby the placeholder is replaced by a value (constraint) provided during runtime: $$<placeholder_name>$$.

In runtime, the consumer can execute a data retrieval on an FSI View and optionally provide the constraints as name-value pairs related to the placeholder names of the defined Restriction Rules. If a constraint is not assigned with a value, the Restriction Rule is ignored and has no effect.

The data selection of the FSI-View may be done by performing the following steps:

1. Applying the Restriction Rules on the node instances used in the view
2. Joining the nodes by using the modeled join conditions
3. Selecting the rows that fulfill the selection condition provided by the Selection Parameters Besides the selection of the relevant data, the consumer can specify the Requested Attributes to indicate which attributes of the Business Object Node are needed. The Requested Attributes are a subset of the BO Node Element Structure.

Restriction Rules can be used in FSI views for flattening. For example a Sales Order can have different types of parties (Sales Order node PARTY). Each party has a special role for the Sales Order. For each role category a restriction rule can be defined in a FSI view to get only data of the requested party type (e.g. ROLE_CATEGORY_CODE=18–Tax Payer Party). When the FSI View includes the ROOT node and the PARTY node joined with a left outer join the result of the query includes data lines for Sales Orders with Tax Payer Party and also an entry for each Sales Order without a Tax Payer Party would be included.

But if the role category code would be specified in the Selection Parameters, the retrieval would only return Sales Orders with a Tax Payer Party. The data of Sales Orders without a Tax Payer Party would be filtered out and these Sales Orders would not be part of the result data.

Restriction Rules are realized in TREX as sub-queries that perform a pre-selection and the pre-selected BO node PARTY records are added as left outer join to the SalesOrder ROOT data.

An Access Control List (ACL) (DO ACCESS_CONTROL_LIST) must be part of the FSI View to enable the RBAM checks during runtime. The Access Control List must be linked with left outer join to the root node. If an inner join would be used to assign the ACL and the authorization check is disabled, the root node instances without a match in the ACL DO would not be part of the query result. The authorization-relevant attributes that are provided by Access Control List need to be defined as View-fields and marked as ACL Fields:

ACL_ACCESS_CONTEXT

ACL_END_DATE

ACL_START_DATE

ACL_UUID

The ACL and its node attributes must be added to the FSI View. The DO Access Control List needs to be added in the FSI View that implements the BO query. The authorization-relevant attributes that are provided by this DO need to be defined as Viewfields and need to be marked as such. In runtime, FSI automatically detects these attributes and creates additional selection criteria based on the user rights. The authorization criteria of the user are provided by the importing parameter in_authorization_context of the QUERY core service FIG. 6BB shows mapping between database level entities and business level entities in this example. Here, since the association modeling is equivalent to the technical FSI Views, the mapping can be performed by a parser of a BO-specific language (such as SADL) that is aware of the association metadata, and knows how the transform that association metadata into their technical representation.

The view field name mapping is represented by the mapping of the source attribute name (binding) to a target name. This mapping is analogous to the view field names of the database level.

In utilizing SADL Queries according to embodiments of the present invention, it is possible to use functions which are executed in TREX, in order to perform some conversions or calculations. These functions are registered in the MDRS repository.

FTAs can syntactically be reflected by SADL functions. Instead of the runtime execution of a modeled function, the call is forwarded to the FSI API during compile time and is executed implicitly by TREX/DB. Therefore the FTA 'metadata' will be provided by Transformation Definition MO instances (e.g. with a separate FTA flag).

In some cases a BO association is based on a foreign-key relationship (e.g. compositions) that can easily mapped to FSI joins. Additionally the consumer may be able to define new joins within the SADL document based on a join condition modeling for non-modeled BO associations (or re-modeling of implemented associations The other intervening levels, however, are not aware of this stored metadata information. In particular, semantically there are identical entities known in the persistency (Database/FSI/TREX). Despite this, conventionally once such an association was modeled with the business objects model, it was not reused and was not automatically mapped. Rather, the user has to re-model the association for each usage in the FSI View of the database model.

By contrast, embodiments of the present invention leverage off of the more powerful capability of the Business Object's model to model BO associations. Such modeling may be based on one or more of a least the following three entities.

Foreign-key relationships can be modeled by using operators (=, <, >, . . . ) and ranges. Each foreign key relationship in the business layer is equivalent to one or more join conditions in the database layer.

Attributes of the resolving node can be bound to constant values. A constant binding in the business layer has the same semantic as a Restriction Rule in the database layer.

Attributes of the resolving node can be bound to a filter parameter. Even a filter parameter is equivalent to a Restriction Rule with placeholder.

Figure 6C:
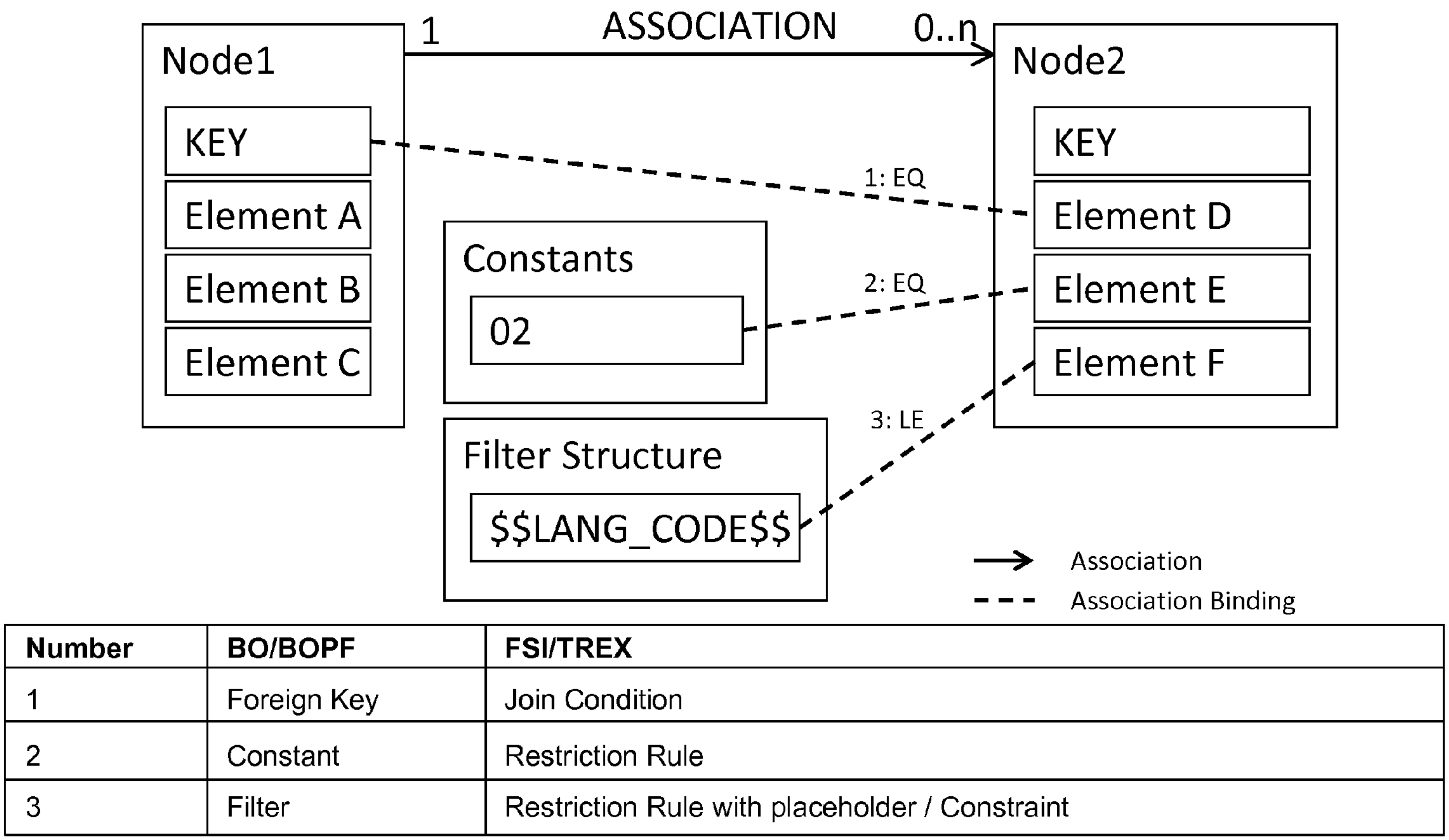
FIG. 6C shows an example of how a BO association can be modeled in the business objects model.

FIG. 6C shows an example of how a BO association can be modeled in the business objects model. In particular, this example shows association from a BusinessPartner to the Address BO.

The address has a foreign key referencing to a key of the business partner. The association has:

a constant binding: type of address=02 if the association refers to billing address; and a filter binding: if the optional value can be set by using the association (the consumer can assign the filter parameter); without the filter value, all addresses are returned; with the filter value, only the matches are returned.

Thus, use of a SADL Query according to embodiments of the present invention allows the leveraging of associations from the BO level, and takes care of the mapping. Since the associations of the business level have already been created as modeled relationships between the nodes, these associations can also be used for the view needed for the query. Such an approach eliminates redundant usage of joins/restrictions in the definition of views for a query.

An approach according to embodiments of the present invention offers certain potential benefits. One potential benefit is the reduction of inconsistencies and errors associated with redundant activities. Another potential benefit is reduced overhead for the developer, as he/she no longer has to know the semantic of the association in order to map it manually to the join/restriction rule.

Still another potential benefit offered by embodiments of the present invention, is closer alignment between the thought processes of business developer, and query structure and performance. In particular, having developed the model for the Business Objects, the developer seeks to articulate the query in a manner fitting that structure, rather than the lower-level database concepts.

Embodiments according to the present invention may simplify query design in a number of respects. This is now illustrated and described in connection with the following example.

Example #2

Figure 2A:
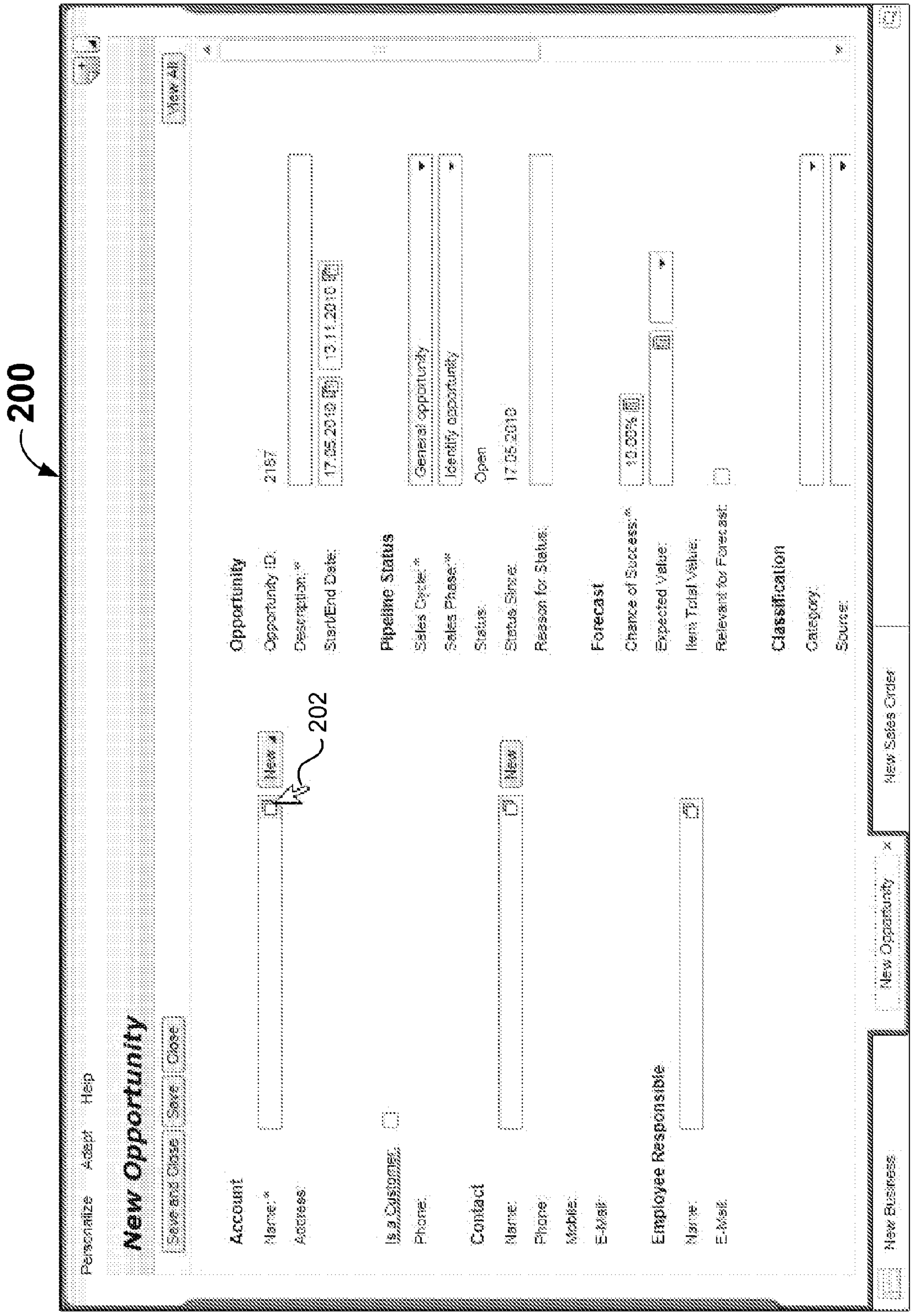
FIG. 2A shows a screen shot of a window of a user interface.
Figure 2B:
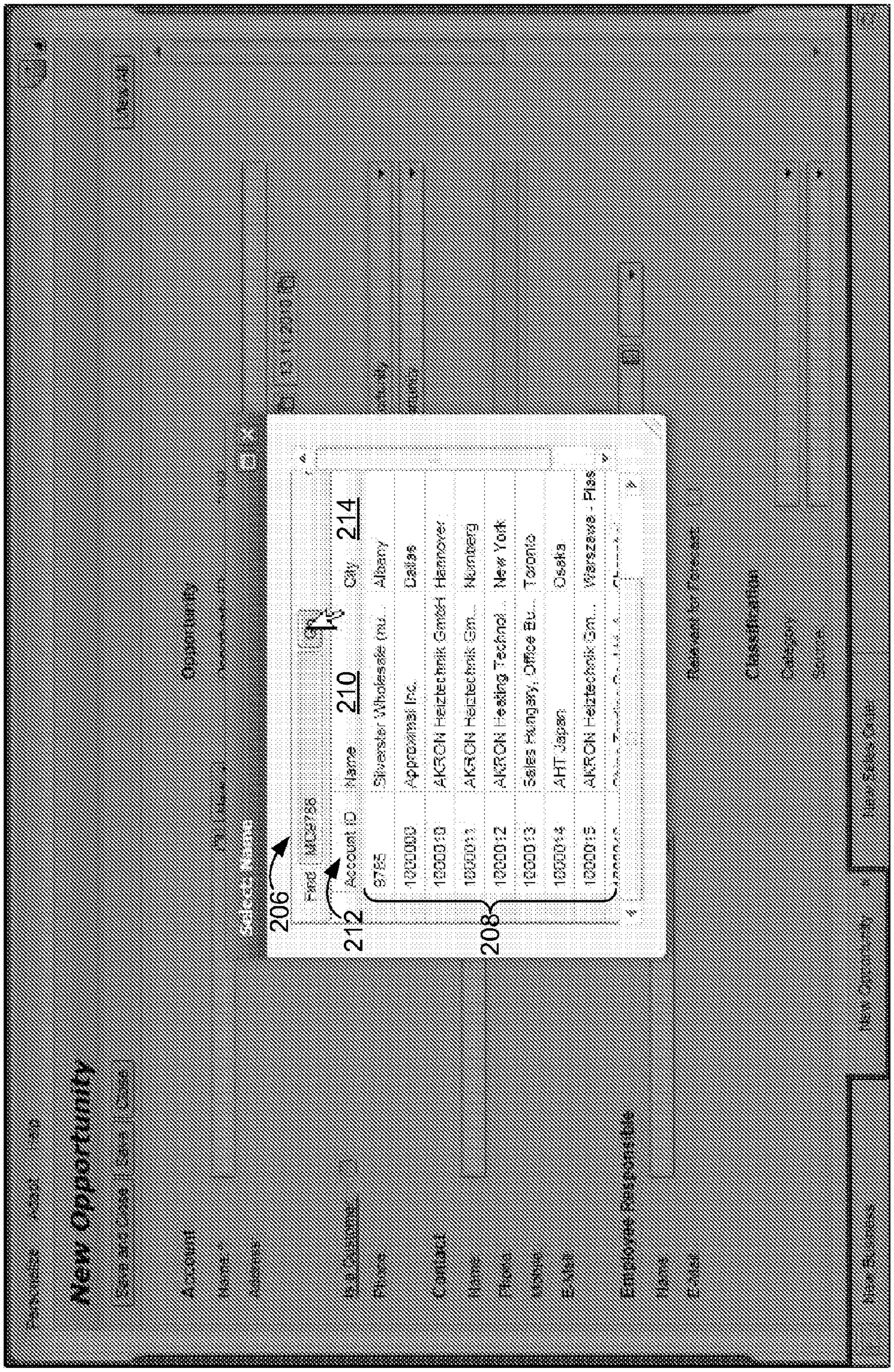
FIG. 2B shows a screen shot of the window of FIG. 2A returning query results.
Figure 2G:
Figure 3:
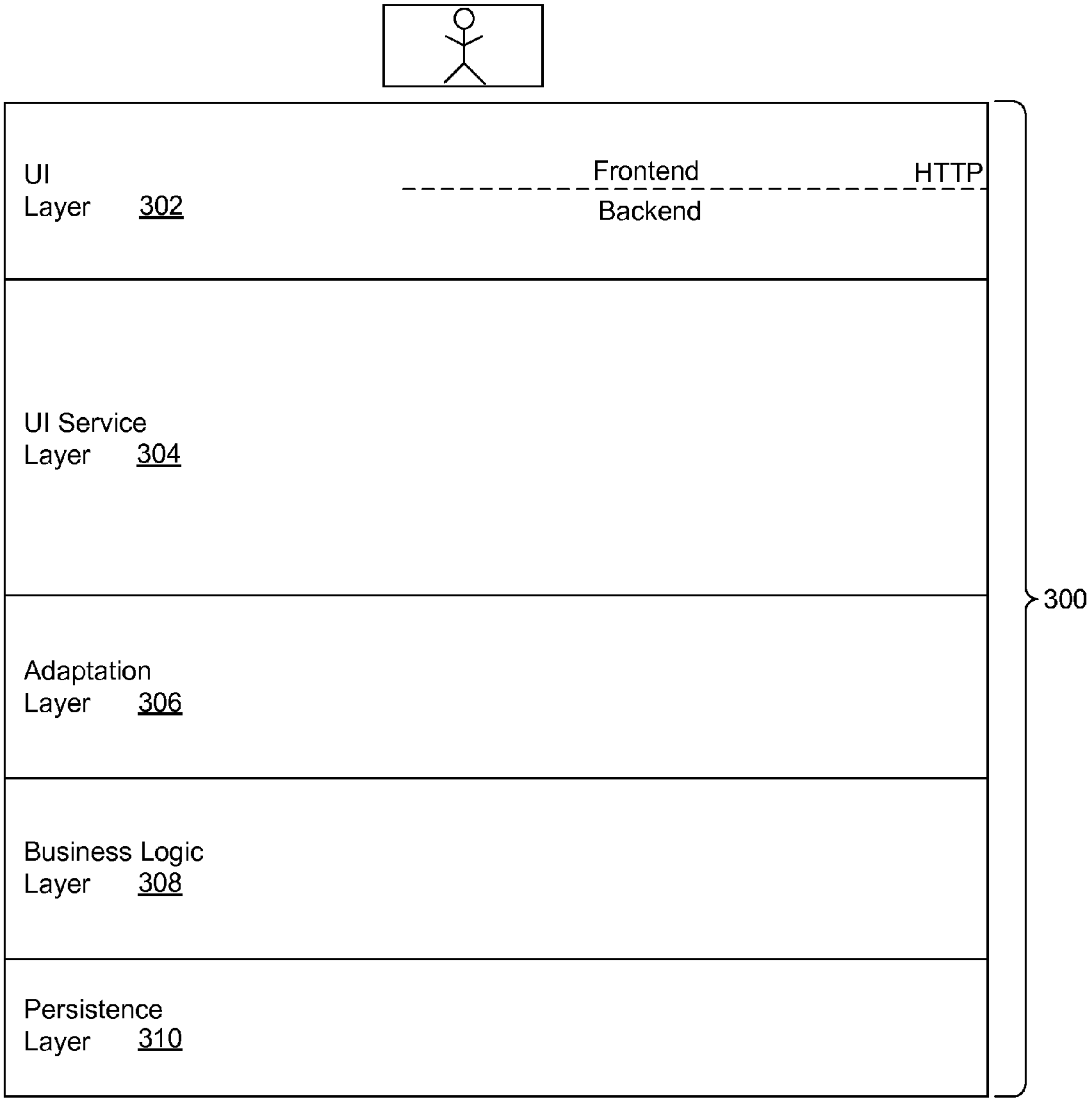
FIG. 3 shows a multi-layer system between a human user and a database.

This example is now provided in connection with a query for reading information from the By Design software, as originally described above in connection with FIGS. 2A-B. In particular, as shown in FIG. 2A a query is posed by the user clicking on a field in the business opportunity window of the user interface. The corresponding data from the database is read and displayed as in FIG. 2B.

Figure 7B:
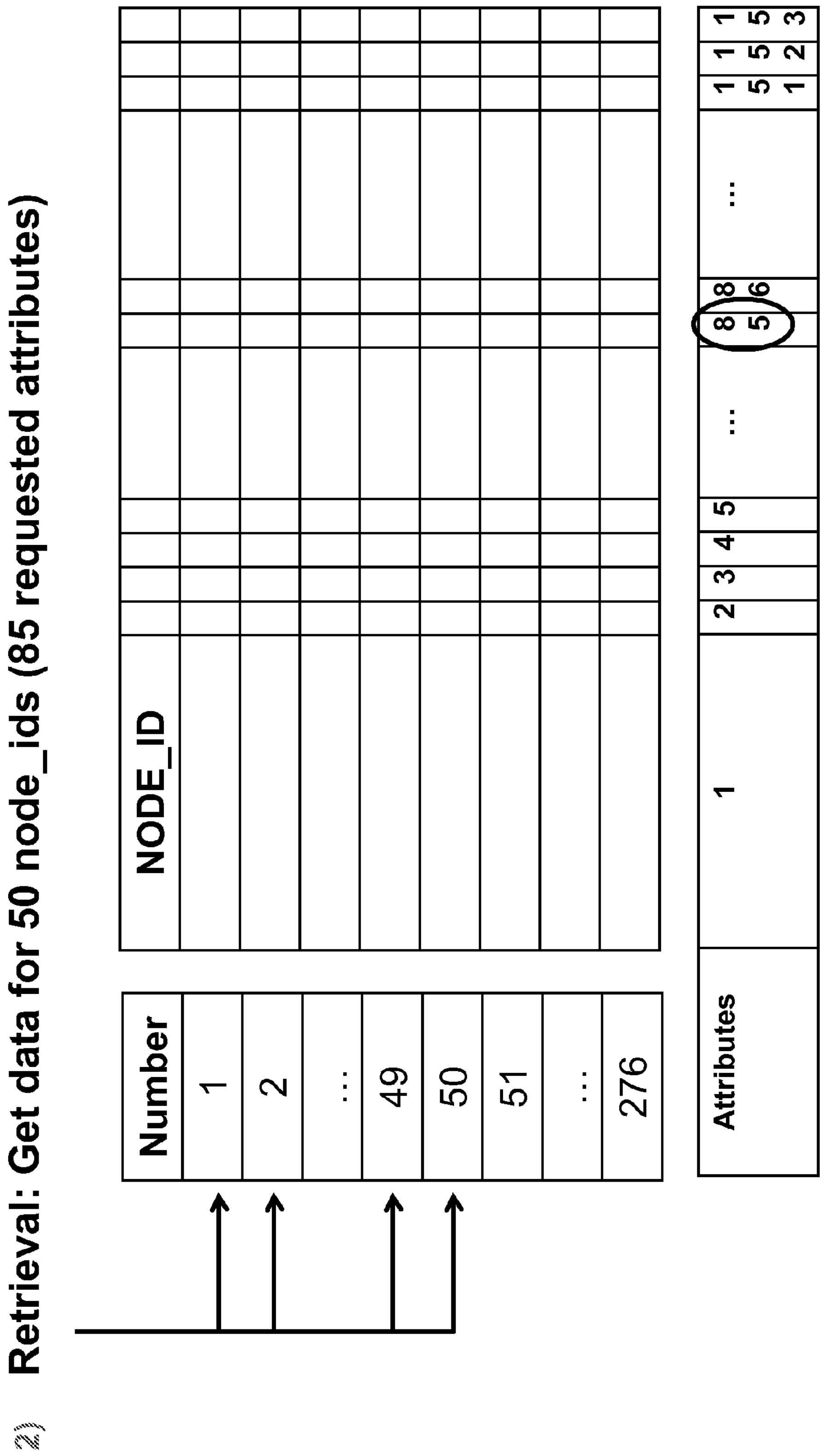

According to the conventional query approach, the data retrieval takes place in two steps. As shown in FIG. 7A, in a first (Selection) step the UI obtains all 276 node_ids' available in the database. Then as shown in FIG. 7B, in a second (Retrieval) step, data is retrieved for 50 node_ids' based upon 85 requested attributes of the query. The callstack for such a conventional query has been shown in FIGS. 4A-B, and is also detailed in FIG. 7C.

Figure 8A:
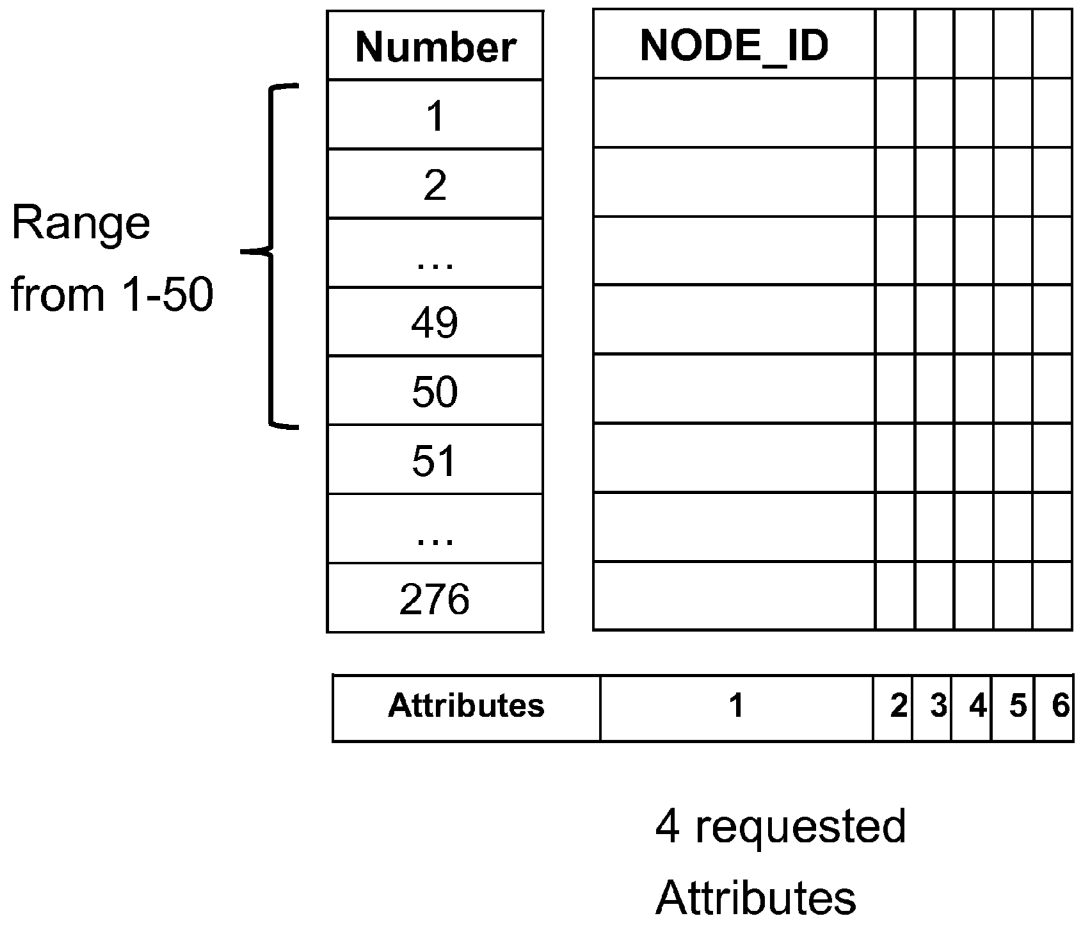
FIG. 8A depicts a step of an embodiment of a query according to the present invention, in a second example.
Figure 8C:
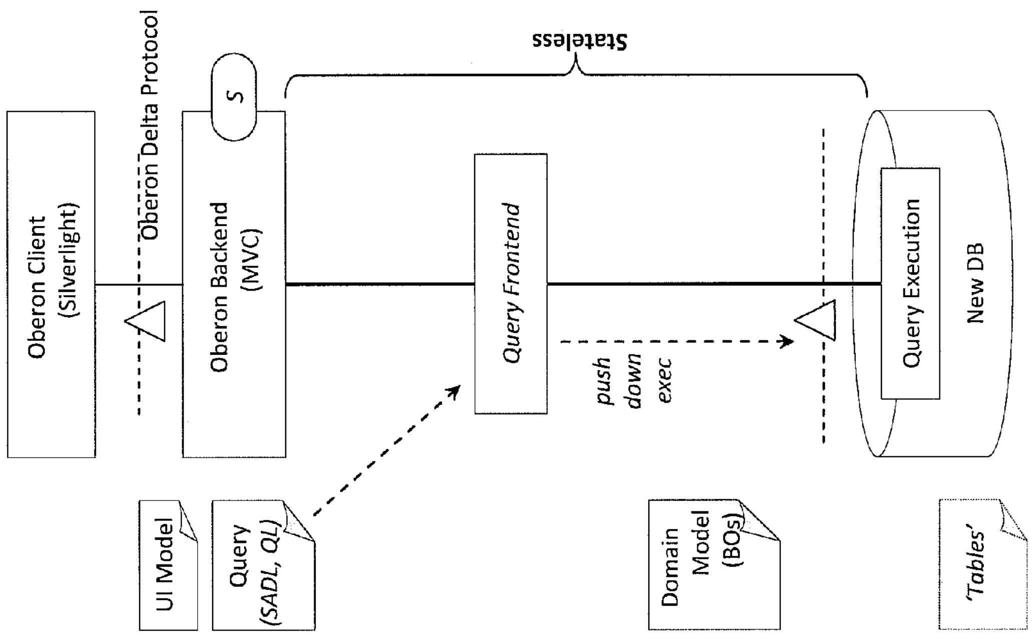
Figure 8B:
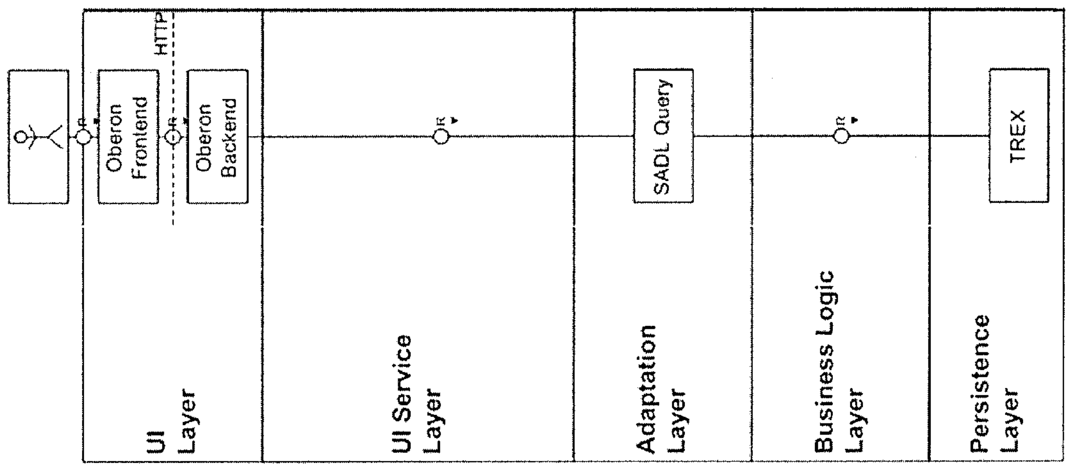

By contrast FIG. 8A shows the query created according to embodiments of the present invention, which combines selection and retrieval functions in a single step based upon 4 requested attributes. FIGS. 8B-D show the callstack for this query.

Figure 9:
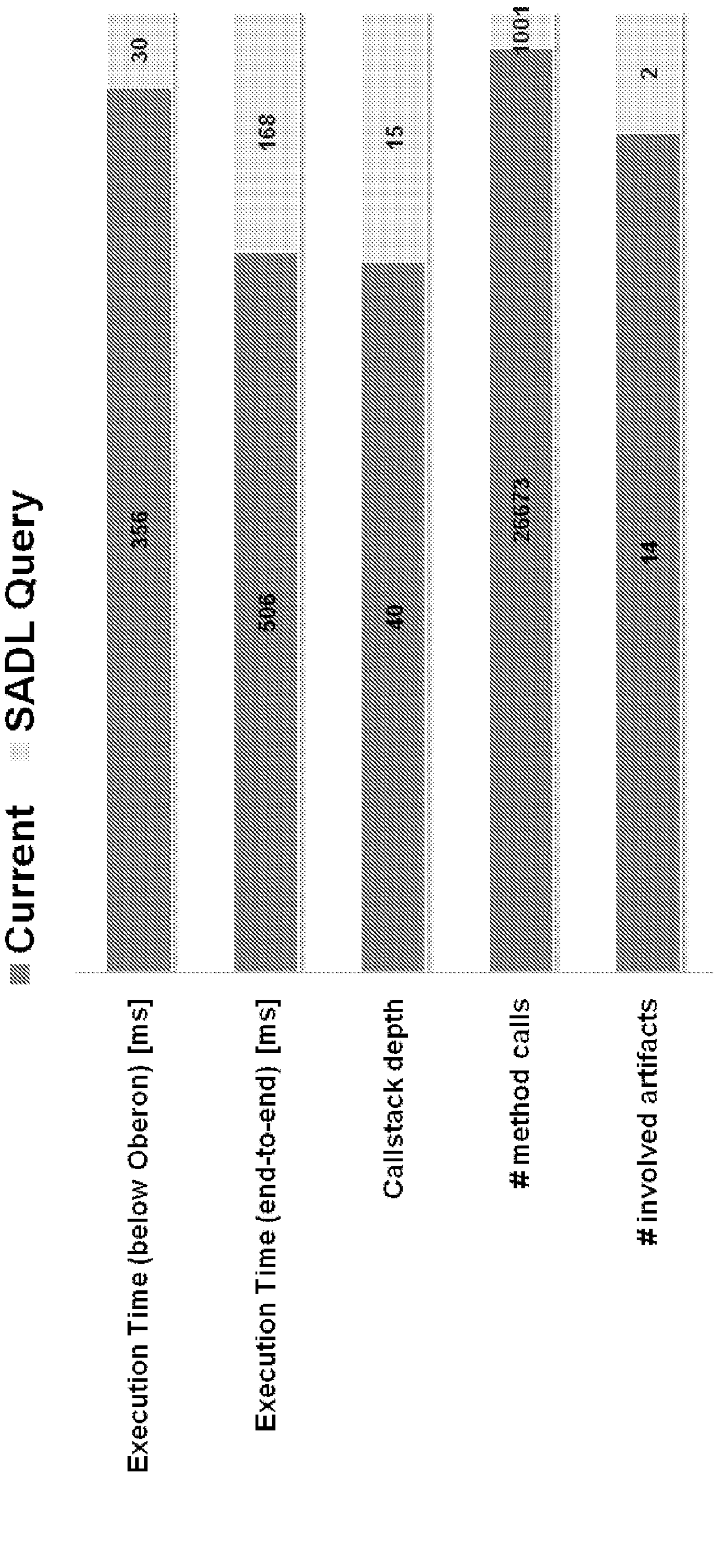
FIG. 9 compares performance characteristics of an embodiment of an SADL query according to an embodiment of the present invention, with a conventional query.

FIG. 9 compares various performance characteristics of the conventionally created (Current) query, versus a query (SADL query) created according to an embodiment of the present invention. The enhanced performance of the SADL query confirms the simplified nature of its callstack (FIGS. 8B-D) developed from the business objects model, as compared with the conventional query callstack (FIGS. 4A-B and 7C) that is created from database-level models.

Specifically, in the runtime callstack of FIGS. 8B-D, the query execution has been pushed down into the database layer. Transformations have been eliminated, as has redundant intermediate buffering of information.

In addition, embodiments of the present invention are able to directly execute the query in the TREX, since the UI modeling capabilities have been enabled/enriched, so that business logic can also be embedded here. Examples include staticCondition+code exits/functions.

Furthermore, embodiments of the present invention facilitate the formation of an entity allowing sorting/searching and analytical features on the database (instead of ALV in the memory), by supporting all data types (CCTS).

Figure 10:
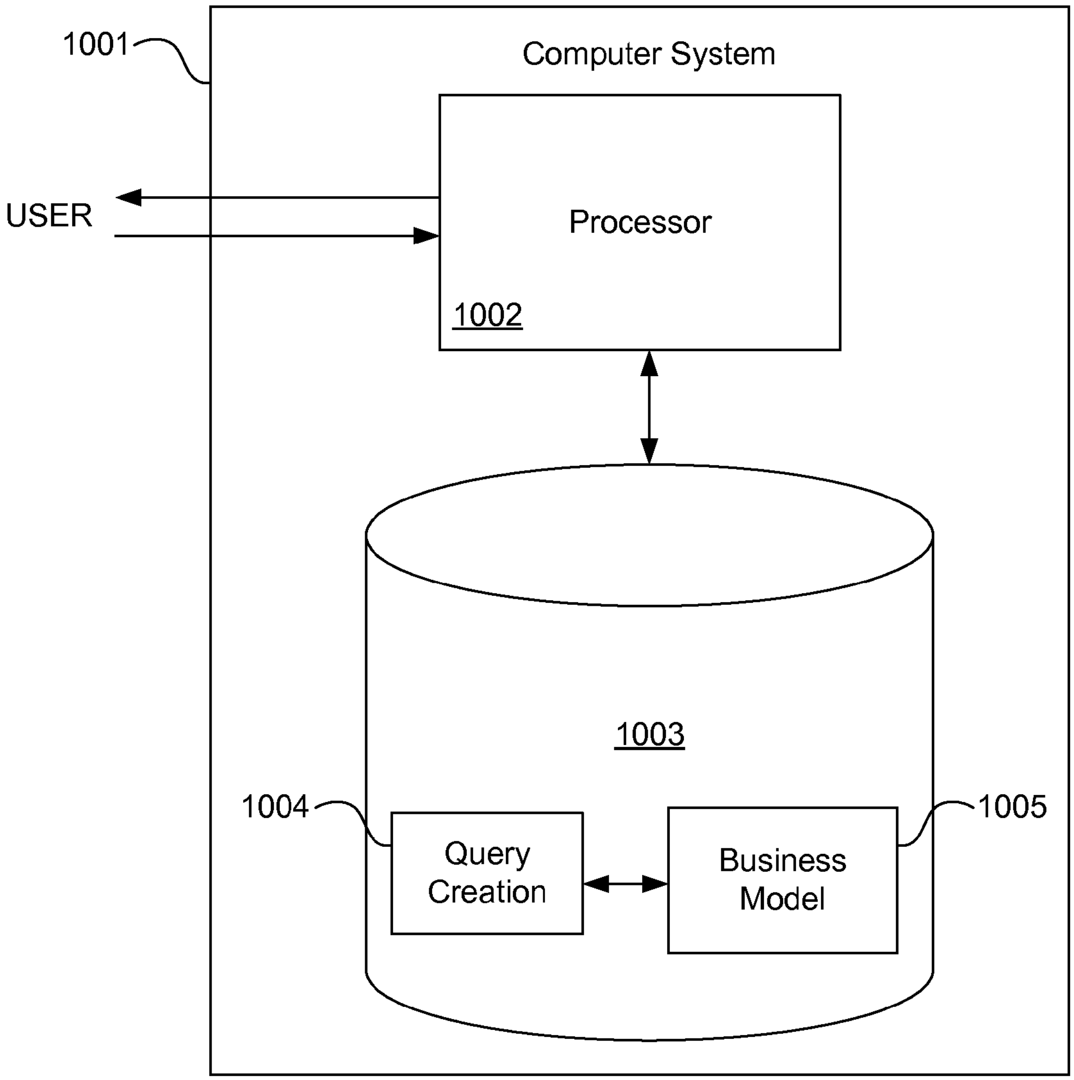
FIG. 10 illustrates hardware of a special purpose computing machine configured to implement model-based query design according to one embodiment of the present invention.

FIG. 10 illustrates hardware of a special purpose computing machine configured to implement model-based query design according to one embodiment of the present invention. In particular, computer system 1001 comprises a processor 1002 that is in electronic communication with a non-transitory computer-readable storage medium 1003. This computer-readable storage medium has stored thereon code 1005 corresponding to the business model, and also code 1004 corresponding to a query creation module configured to reference the business model and metadata extant therein.

The computer system may comprise a software server. A number of software servers together may form a cluster, or logical network of computer systems programmed with software programs that communicate with each other and work together to process requests.

Figure 11:
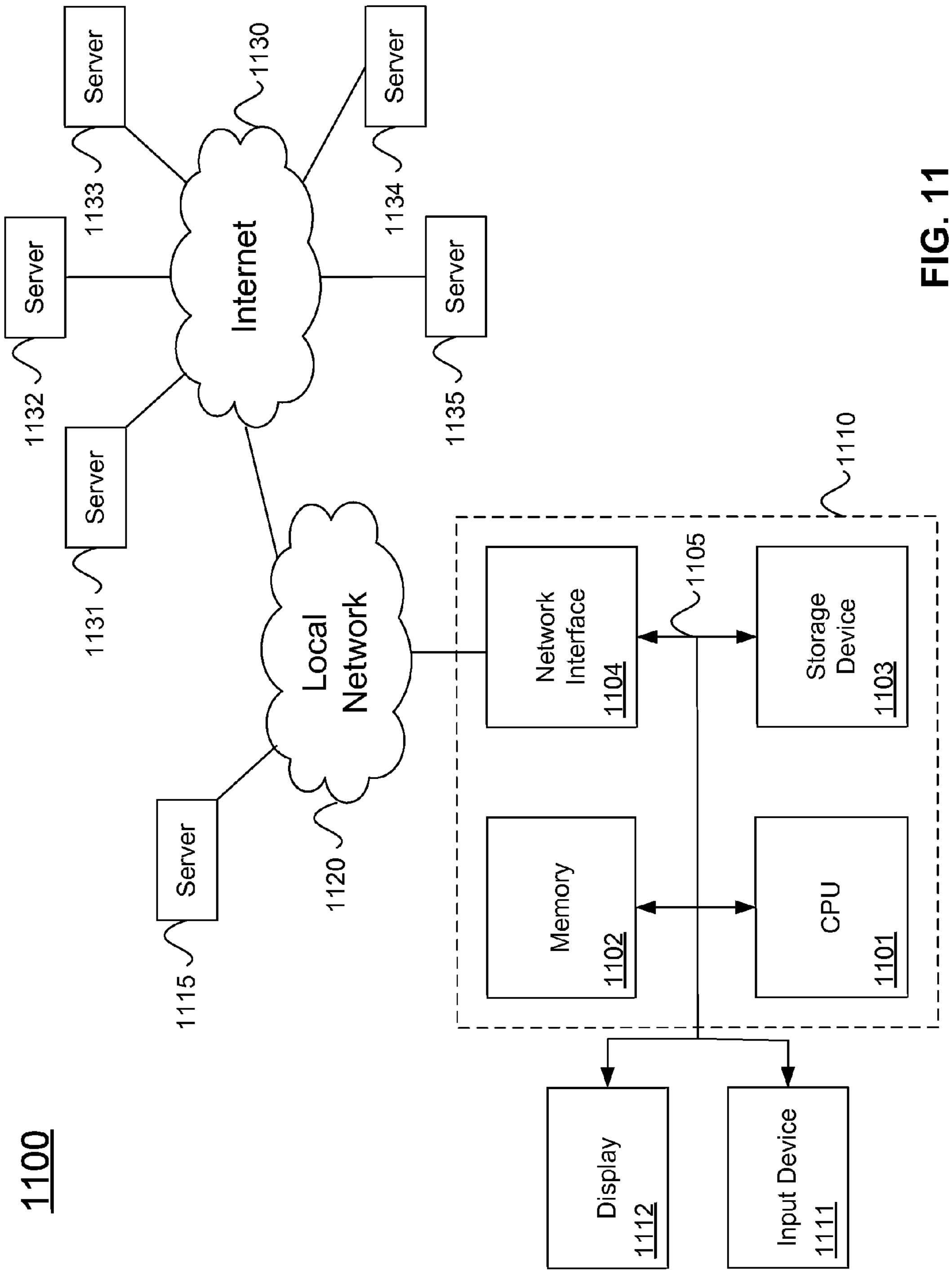
FIG. 11 illustrates an example of a computer system.

An example computer system 1110 is illustrated in FIG. 11. Computer system 1110 includes a bus 1105 or other communication mechanism for communicating information, and a processor 1101 coupled with bus 1105 for processing information.

Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both.

A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 1103 may include source code, binary code, or software files for performing the techniques above, for example. Storage device and memory are both examples of computer readable media. The computer system generally described in FIG. 11 includes at least those attributes described in FIG. 10.

Computer system 1110 may be coupled via bus 1105 to a display 1112, such as a cathode ray tube (CRT) or liquid crystal display (LCD), for displaying information to a computer user. An input device 1011 such as an in-vehicle touch screen, is coupled to bus 1005 for communicating information and command selections from the user to processor 1001. The combination of these components allows the user to communicate with the system. In some systems, bus 1005 may be divided into multiple specialized buses.

Computer system 1110 also includes a network interface 1104 coupled with bus 1005. Network interface 1104 may provide two-way data communication between computer system 1010 and the local network 1120. The network interface 1104 may be for Broadband Wireless Access (BWA) technologies. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein.

In an example involving the Internet, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

providing a database comprising a plurality of database-level entities;

referencing a business object model to create a business layer in direct communication with the database, the business layer comprising a plurality of business-level entities including at least one association between the plurality of business-level entities, wherein the business object model includes association metadata;

providing a user interface in communication with the business layer;

referencing the business object model only to create a query of the database, the query including mappings derived from the association metadata and comprising direct links between the plurality of business-level entities and the plurality of database-level entities, the query further including a constraint comprising a selection parameter filtering a view of the business object model; and causing the user interface to execute the query delegated to the database and return corresponding data read from the database;

wherein the business-level entities are defined in a business object-related domain specific language comprising Service Adaptation Definition Language (SADL) reflecting the constraint in order to produce a simplified query result.

2. The method of claim 1 wherein the association is used to create a query view.

3. The method of claim 1 wherein a business-level entity comprises a foreign-key relationship corresponding to a database-level join condition entity.

4. The method of claim 1 wherein a business-level entity comprises a resolving node having attributes bound to constant values corresponding to a restriction rule in the database.

5. The method of claim 1 wherein a business-level entity comprises a resolving node having attributes bound to a filter parameter corresponding to a restriction rule with a placeholder in the database.

6. A non-transitory computer readable storage medium embodying a computer program for performing a method, said method comprising:

providing a database comprising a plurality of database-level entities;

referencing a business object model to create a business layer in direct communication with the database, the business layer comprising a plurality of business-level entities including at least one association between the plurality of business-level entities, wherein the business object model includes association metadata;

providing a user interface in communication with the business layer;

referencing the business object model only to create a query of the database, the query including mappings derived from the association metadata and comprising direct links between the plurality of business-level entities and the plurality of database-level entities, the query further including a constraint comprising a selection parameter filtering a view of the business object model; and causing the user interface to execute the query delegated to the database and return corresponding data read from the database;

wherein the business-level entities are defined in a business object related domain specific language comprising Service Adaptation Definition Language (SADL) reflecting the constraint in order to produce a simplified query result.

7. The non-transitory computer readable storage medium of claim 6 wherein the association is used to create a query view.

8. The non-transitory computer readable storage medium of claim 6 wherein a business-level entity comprises a foreign-key relationship corresponding to a database-level join condition entity.

9. The non-transitory computer readable storage medium of claim 6 wherein a business-level entity comprises a resolving node having attributes bound to constant values corresponding to a restriction rule in the database.

10. The non-transitory computer readable storage medium of claim 6 wherein a business-level entity comprises a resolving node having attributes bound to a filter parameter corresponding to a restriction rule with a placeholder in the database.

11. A computer system comprising:

one or more processors;

a software program, executable on said computer system, the software program configured to:

provide a database comprising a plurality of database-level entities;

reference a business object model to create a business layer in direct communication with the database, the business layer comprising a plurality of business-level entities including at least one association between the plurality of business-level entities, wherein the business object model includes association metadata;

provide a user interface in communication with the business layer;

reference the business object model only to create a query of the database, the query including mappings derived from the association metadata and comprising direct links between the plurality of business-level entities and the plurality of database-level entities, the query further including a constraint comprising a selection parameter filtering a view of the business object model; and cause the user interface to execute the query delegated to the database and return corresponding data read from the database;

wherein the business-level entities are defined in a business object related domain specific language comprising Service Adaptation Definition Language (SADL) reflecting the constraint in order to produce a simplified query result.

12. The computer system of claim 11 wherein the association is used to create a query view.

13. The computer system of claim 11 wherein a business-level entity comprises a foreign-key relationship corresponding to a database-level join condition entity.

14. The computer system of claim 11 wherein a business-level entity comprises a resolving node having attributes bound to constant values corresponding to a restriction rule in the database.

15. The computer system of claim 11 wherein a business-level entity comprises a resolving node having attributes bound to a filter parameter corresponding to a restriction rule with a placeholder in the database.

* * * * *